United States Patent
Chifei et al.

(10) Patent No.: US 6,265,475 B1
(45) Date of Patent: Jul. 24, 2001

(54) HIGH DAMPING MATERIAL COMPOSITION

(75) Inventors: Wu Chifei, Komaki; Takeshi Nomura, Nagoya; Toshiyuki Mihara, Komaki; Kazunobu Hashimoto, Nagoya; Tetsuya Takeuchi, Komaki, all of (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/363,749

(22) Filed: Jul. 30, 1999

(30) Foreign Application Priority Data

| Jul. 30, 1998 | (JP) | 10-215406 |
| Jul. 31, 1998 | (JP) | 10-217364 |
| Jul. 31, 1998 | (JP) | 10-217398 |
| Aug. 4, 1998 | (JP) | 10-219998 |
| Aug. 4, 1998 | (JP) | 10-220015 |
| Sep. 8, 1998 | (JP) | 10-253797 |
| Dec. 8, 1998 | (JP) | 10-349201 |
| Dec. 8, 1998 | (JP) | 10-349202 |

(51) Int. Cl.$^7$ ..................................... C08K 5/53
(52) U.S. Cl. .................. 524/127; 524/126; 524/323; 524/348; 252/45
(58) Field of Search ................... 524/101, 126, 524/127, 323, 348, 351, 352; 252/123; 525/455; 521/50, 67, 128

(56) References Cited

U.S. PATENT DOCUMENTS 5,279,896 * 1/1994 Tokunaga et al. ............... 428/355
5,852,082 * 12/1998 Uchida et al. .................. 524/101

* cited by examiner

Primary Examiner—Edward J. Cain
Assistant Examiner—Wyrozebski Lee

(74) Attorney, Agent, or Firm—Armstrong, Westerman, Hattori, McLeland & Naughton LLP

(57) ABSTRACT

A high damping material composition useful as a vibration damper and an acoustic insulating material such as a sound insulating wall for an acoustic room, a sound insulating partition for a construction structure and a soundproofing wall for a vehicle. The high damping material composition of the present invention containing the following components (A) and (B);

(A) a polymer having in the molecular chain thereof a chemical structural unit derived from the following (a);

(a) at least one selected from the group consisting of an acrylic monomer, a methacrylic monomer, an ethylene-acrylic copolymer, an ethylene-methacrylic copolymer and vinyl acetate;

(B) at least one damping property imparting agent selected from the group consisting of a hindered phenol compound, a phosphite ester compound, a phosphate ester compound, a basic compound containing nitrogen and a hindered amine compound. The combined use of the component (A) and (B) makes an interaction therebetween homogeneous and appropriate, so that the component (B) is homogeneously dispersed in the component (A), resulting in exhibition of a high tan δ. Moreover, the homogeneous dispersion can be maintained for a long period thereby to prevent a declined of tan δ with time. The compositions have a tan δ peak temperature of approximately room temperature, which makes the compositions suitable for use in a room temperature atmosphere.

15 Claims, 4 Drawing Sheets

HIGH DAMPING MATERIAL COMPOSITION

FIELD OF THE INVENTION

This invention relates to a thigh damping material composition, particularly to a high damping material composition useful as a vibration damper and an acoustic insulating material such as a sound insulating wall for an acoustic room, a sound insulating partition for a construction structure and a soundproofing wall for a vehicle.

BACKGROUND OF THE INVENTION

High-molecular materials for use in high damping material compositions generally exhibit a typical viscoelastic behavior. When the materials vibrate from any cause, a complex sine strain ($\epsilon^*$) is generated on each material, and thereby a complexing stress ($\sigma^*$) is generated. A complex elastic modulus ($E^*$) is a ratio of these as described in the following formula:

Complex elastic modulus ($E^*$)=Complex sine stress ($\sigma^*$)/Complex sine strain ($\epsilon^*$)

A real part of the above complex elastic modulus ($E^*$) is defined as a storage elastic modulus (E') relating to an elastic property of the high-molecular material. An imaginary part thereof is defined as a loss elastic modulus (E") relating to a viscous property of the high-molecular material. A loss tangent (tan $\delta$) is a ratio of these as described in the following formula:

Loss tangent (tan $\delta$)=Loss elastic modulus (E")/Storage elastic modulus(E')

The loss tangent (tan $\delta$) is a one of factors for determining a sound and vibration damping feature, and therefore as the high damping material composition has a higher figure of the factor, a dynamic energy is absorbed and released in the form of electric or thermal energy, and the composition exhibits an excellent mechanical characteristics such as acoustic absorbing properties, or vibration-damping properties. A conventional high damping material composition is required to have a loss tangent (tan $\delta$) of not less than 0.5.

The inventors of the present invention proposed a high damping material composition, which meets the above conventional prescribed property (tan $\delta \geq 0.5$), prepared by blending a polymer having a polar side chain with a damping property imparting agent comprising a basic substance having at least one base selected from the group consisting of secondary amines, tertiary amines and heterocyclic compounds containing nitrogen. (Japanese Patent Application No. HEI9-362125)

Although the above high damping material composition satisfied the conventional prescribed property (tan $\delta \geq 0.5$), it is desired for an environment for use thereof or a requirement for application that the high damping material composition exhibits a higher tan $\delta$ (tan $\delta \geq 2.0$, more preferably tan $\delta \geq 2.5$). Further, the damping property imparting agent may be crystallized or a bleeding (exudation) may take place due to dispersion thereof, and therefore the tan $\delta$ quickly declines, so that it can not keep a tan $\delta$ at the time of formation after a short period such as 2 weeks to one month, thereby losing its damping property. Moreover, the high damping material composition has a tan $\delta$ peak notably away from a room temperature at which the composition is supposed to be used most frequently. Thus, it is impossible to make the best use of the damping capability thereof under an environment desirable for use.

SUMMARY OF THE INVENTION

In view of the foregoing, it is an object of the present invention to provide a high damping material composition which exhibits a high tan $\delta$ and a small decline of the tan $\delta$ with time, and has a tan $\delta$ peak temperature in the range of ambient or room temperature (20° C.±5° C.).

In accordance with the present invention, there is provided a high damping material composition comprising the following components (A) and (B);

(A) a polymer having in the molecular chain thereof a chemical structural unit derived from the following (a);

(a) at least one selected from the group consisting of an acrylic monomer, a methacrylic monomer, an ethylene-acrylic copolymer, an ethylene-methacrylic copolymer and vinyl acetate;

(B) at least one damping property imparting agent selected from the group consisting of a hindered phenol compound, a phosphite compound, a phosphate ester compound, a basic compound containing nitrogen and a hindered amino compound.

The inventors of the present invention made intensive research in order to find out a reason why conventional high damping material compositions cannot exhibit more advantageous damping properties. As a result of their research, they found that the interaction between the polymer and the damping property imparting agent was unhomogeneous and a power of the interaction was not appropriate, and thus it is difficult to ensure an appropriate and homogeneous interaction by a conventional combination of the polymer and the damping property imparting agent. As a consequence, the conventional damping material composition is unable to exhibit higher damping properties. Further, the conventional damping property imparting agent is rigid, and it has a small degree of molecular bond and a less three-dimensional structural mobility. For example, the heterocyclic compound has a symmetry, and therefore has a geometrical situation to easily form a regular arrangement of its molecules. Moreover, the inventors have made sure that, when the polymer becomes rubber-like state, the molecular cohesive energy of the polymer becomes smaller, the bonding chain of the polymer becomes movable more easily, so that the damping property imparting agent does not become dispersed homogeneously in the polymer, and thus results in crystallization or bleeding of the damping property imparting agent. As a result of intensive researches on combinations of a polymer and a damping property imparting agent for accomplishing an appropriate and homogeneous interaction therebetween, the inventors of the present invention have found that a combination use of a specific polymer (component A) and a specific damping property imparting agent (component B) can provide a high damping material composition having the component (B) homogeneously dispersed in the component (A) so that the high damping material composition can exhibit a high tan $\delta$. In addition, the high damping material composition can maintain a homogeneous dispersion of the component (B) for a long period, thereby inhibiting a decline of tan $\delta$ with time. Further, the high damping material composition has a tan $\delta$ peak temperature in the range of ambient or room temperature, and therefore it is suitable for use in a room temperature environment. Thus, the inventors have attained the invention.

Furthermore, it has been found that a regulator for the peak temperature of a damping property may be used together with the specific polymer (A) and the specific damping property imparting agent (B) for designing a material to have a peak temperature in the range of temperatures suitable for the intended use. Moreover, it is possible to cause no bleeding and to inhibit a decline of tan $\delta$ with time.

When a specific damping property imparting agent (component D) for shifting the peak temperature of damping properties to lower value is used in combination, it is possible to design the material composition having the peak temperature suitable for the range of temperatures in the intended use while holding a high tan δ.

Further, an acidic organic compound (component E) may be used in combination for providing an appropriate acidity of formulation ingredients and inhibiting a decline of tan δ with time. The acidic organic compound (compound E) is available at a relatively low price, and when the component E is mixed, the formulation amount of component B can be reduced so that the production cost becomes cheaper.

Furthermore, use of a specific amorphous resin (component F) in combination does not cause deposition or crystallization of the damping property imparting agent (B) so that the component B is dispersed in the component A for a long time. Thus, an excellent damping capacity can permanently be maintained.

Moreover, use of a specific plasticizer (component G) in combination can reduce the formulation amount of the component B to make the raw materials cheaper.

Still further, use of a specific crosslinking agent (component H) and a crosslinking accelerator in combination can provide a hydrogen bond (pseudo crosslinking) of the polar side chain of the polymer (A) to the specific damping property imparting agent (B) resulting in a high damping property. In addition, crosslinking is formed in a side chain by way of a covalent bond, and therefore a permanent compression set property is remarkably improved.

Further, when a specific foaming agent (component I) is used in combination, the foaming agent (component I) is thermally decomposed at a decomposition temperature (gas-generation temperature) to generate a gas and to form a cell structure in the polymer (A), resulting in an improved impact absorbing performance against a light load. The material composition has a lower specific gravity due to the cell structure, and thus the cost for materials can be reduced.

BRIEF DESCRIPTION OF THE DRAWINGS

FIG. 1 is a graph showing temperature changes of tan δ of Examples 14a to 16a and Comparative Example 1a;

FIG. 2 is a graph showing temperature changes of tan δ of Examples 15a, 17a and 18a;

FIG. 3 is a graph showing temperature changes of Young's modulus of Examples 15a, 17a and 18a;

DETAILED DESCRIPTION OF THE PREFERRED EMBODIMENTS

Figure 1:
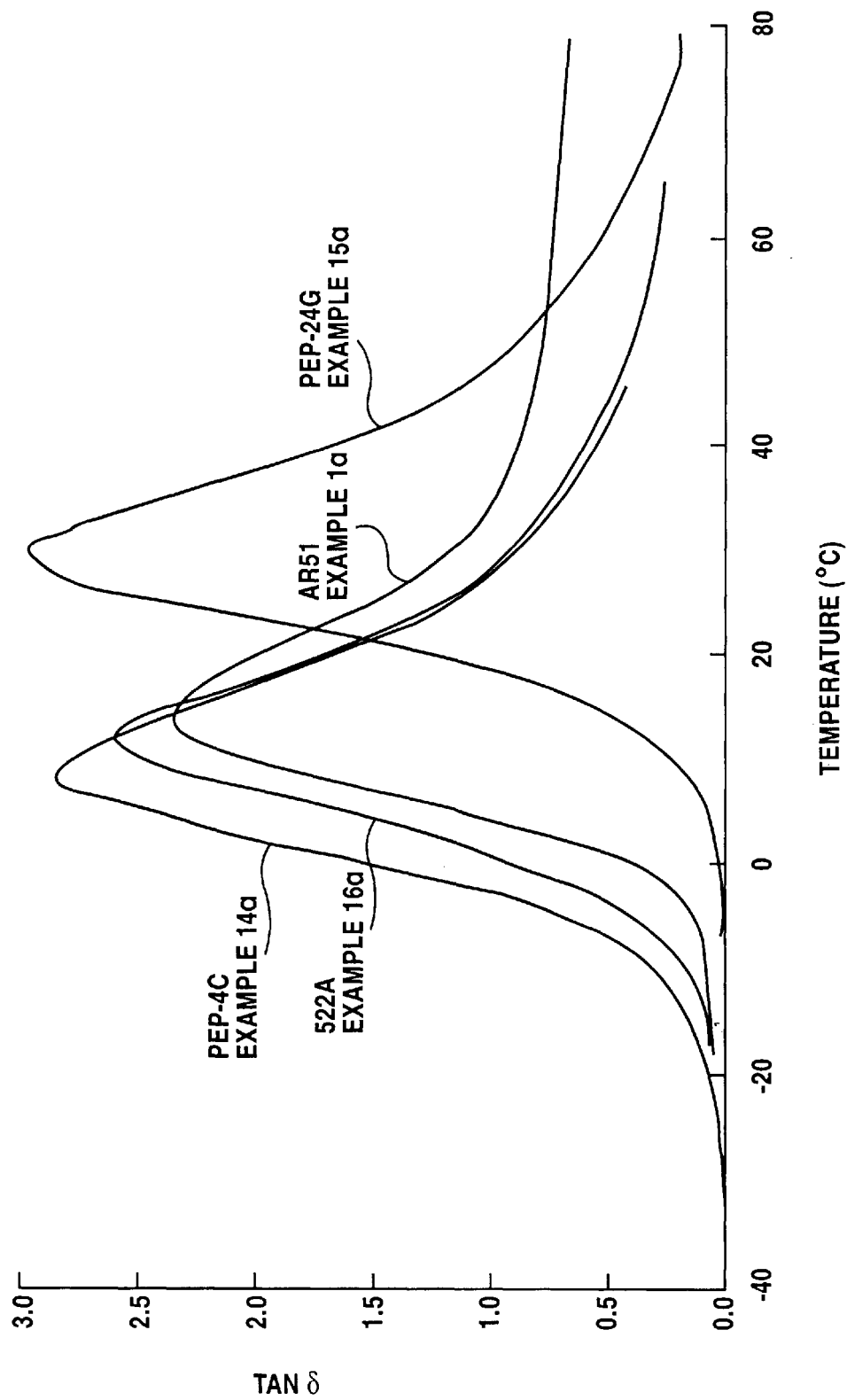

The present invention will hereinafter be described in detail by way of various embodiments thereof.

In accordance with the present invention, a high damping material composition is obtained by using the specific polymer (component A) and the specific damping property imparting agent (component B).

The polymer (A) to be used in the present invention has in the molecular chain thereof a chemical structural unit derived from the following (a);

(a) at least one selected from the group consisting of an acrylic monomer, a methacrylic monomer, an ethylene-acrylic copolymer, an ethylene-methacrylic copolymer and vinyl acetate.

Particularly, an example of the chemical structural unit derived from the acrylic monomer is described by the general formula (1). An example of the chemical structural unit derived from the methacrylic monomer is described by the general formula (2). An example of the chemical structural unit derived from the ethylene-acrylic copolymer is described by the general formula (3). An example of the chemical structural unit derived from the ethylene-methacrylic copolymer is described by the general formula (4). An example of the chemical structural unit derived from the vinyl acetate is described by the general formula (5).

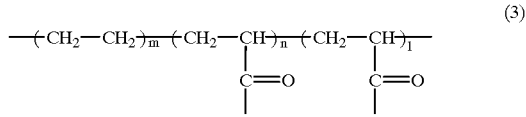

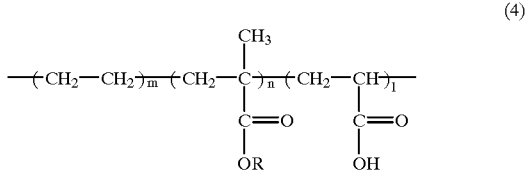

(wherein R is an organic group; n, m and l are natural numbers.)

The organic group represented by R is not limited, as long as it is a polar basic group. Examples of the organic group include an alkyl group such as a methyl group, an ethyl group and a propyl group, and an alkoxyl group such as a methoxyethyl group and an ethoxyethyl group, among which a methyl group and an ethyl group are preferred in terms of heat, resistance, oil resistance and weather resistance.

The specific polymer (A) preferably has a molecular weight of 10,000 to 1,000,000, more preferably 20,000 to 300,000.

The specific damping property imparting agent (B) to be used along with the specific polymer (A), comprises at least one selected from the group consisting of a hindered phenol compound, a phosphite ester compound, a phosphate ester compound, a basic compound containing nitrogen and a hindered amine compound.

Examples of the hindered phenol compound include an antioxidant such as tris-(3,5-di-t-butyl-4-hydroxybenzyl)-isocyanurate, 1,1,3-tris(5-t-butyl-4-hydroxy-2-methylphenyl)butane, 4,4'-butylidenbis(3-methyl-6-t- butylphenol), pentaerythrityl-tetra[3-(3,5-di-t-butyl-4-hydroxyphenyl)propionate], tryethylene glycol-bis[3-(3-t-butyl-5-methyl-4-hydroxyphenyl)propionate], 3,9-bis[1,1-dimethyl-2-[(3-t-butyl-4-hydroxy-5-methylphenyl)propionyloxy]ethyl]-2,4,8,10-tetraoxaspiro[5,5]undecane, 1,3,5-trimethyl-2,4,6-tris-(3,5-di-t-butyl-4-hydroxybenzyl)-benzene, 1,6-hexanediol-bis [3-(3,5-di-t-butyl-4-hydroxyphenyl)propionate], 2,2-thiodiethylenebis[3-(3,5-di-t-butyl-4-hydroxyphenyl)propionate], 2,2'-methylenebis (4-ethyl-6-t-butylphenol), 2,2'-methylenebis(4-methyl-6-t-butylphenol), 4,4'-thiobis(3-methyl-6-t-butylphenol), a butylated product of p-cresol and dicyclopentadiene, 2,5-di-t-butylhydroquinone and 2,5-di-t-amylhydroquinone, an ultraviolet absorber such as 1,4-bis(4-benzoyl-3-hydroxyphenoxy)-butane and a light stabilizer such as 1-[2-{3-(3,5-di-t-butyl-4-hydroxyphenyl)propionyloxy}ethyl-4-{3-(3,5-di-t-butyl-4-hydroxyphenyl)propionyloxy}-2,2,6,6-tetramethylpiperidine. These may be used either alone or in combination.

Examples of the phosphite ester compound include di(nonylphenyl)pentaerythritol diphosphite, bis(2,4-di-t-butylphenyl)pentaerythritol diphosphite and hexa(tridecyl)-1,1,3-tris(2-methyl-4-hydroxy-5-t-butylphenyl) butanetriphosphite. These may be used either alone or in combination.

Examples of the phosphate ester compound include triphenyl phosphate(TPP), 2-ethylhexyl diphenyl phosphate, tricresyl phosphate, trixylenyl phosphate cresyl diphenyl phosphate and cresyl-di-2,6,-xylenyl phosphate. These nay be either alone or in combination.

Examples of the basic compound containing nitrogen include N,N'-diphenyl guanidine, N,N'-diorthotolylguanidine, tris(2,3-diboromopropyl isocyanurate, polyethylene-imine, and 8-acetyl-3-dodecyl-7,7,9,9-tetramethyl-1,3,8-triazaspiro[4.5]decane-2,4-dione. These may be either alone or in combination.

Examples of the hindered amine compound include tetrakis(2,2,6,6-tetramethyl-4-piperidyl)-1,2,3,4-butanetetkacarboxylate, a condensate of 1,2,3,4-butanetetracarboxylic acid, 2,2,6,6-tetramethyl-4-piperidinol and β, β, β', β'-tetramethyl-3,9-(2,4,8,10-tetraoxyaspiro[5.5]undecane)diethanol, a mixture of β-alanine,N-(2,2,6,6-tetramethyl-4-piperidinyl)-dodecylester and β-alanine,N-(2,2,6,6-tetramethyl-4-piperidinyl)-tetradecylester, 3-dodecyl-1-(2,2,6,6-tetramethyl-4-piperidinyl)pyrrolidine-2,5-dione and N-acetyl-3-dodetyl-1-( 2,2,6,6,-tetramethyl-4-piperidinyl) pyrrolidine2,5-dione. These may be used either alone or in combination.

The hindered amine compound preferably has a molecular weight of 500 to 2,000, more preferably 800 to 1,500. If the molecular weight is less than 500, it becomes difficult for the hindered amine compound to be homogeneously dispersed in the polymer for a long time, causing changes with time. If the molecular weight exceeds 2,000, the hindered amine compound cannot be dispersed homogeneously in the polymer, resulting in difficulty in exhibiting a high damping property.

The damping property imparting agent (B) is preferably present in a proportion of 10 to 300 parts by weight (hereinafter abbreviated to "parts"), more preferably 10 to 150 parts, most preferably 30 to 50 parts, based on 100 parts of the polymer (A). If the proportion is less than 10 parts, it is difficult to exhibit a high damping property. If the proportion is greater than 300 parts, blooming takes place and the cost becomes too high.

The high damping material composition of the present invention may contain a regulator (C) for a peak, temperature of a damping property in addition to the specific polymer (A) and the specific damping property imparting agent (B). By using the regulator (C), it becomes possible to design a material having a peak temperature in the range of temperatures for the intended use. Further, without bleeding of the damping property imparting agent (B), a decline of tan δ with time can be inhibited.

The regulator (C) to be herein used is at least one of (1)a compound having a polyamine as a main skeleton structure (polyamine compound) and (2)a compound having polyamide amine as a stain skeleton structure (polyamide amine).

Examples of the polyamine compound include an adduct of xylylenediamine with alkyl glycidyl ether and an adduct, of xylylenediamine with glycidyl ether. Examples of the polyamide amine compound include a polycondensate of a polymerized fatty acid($C_{36}$), polyethylene polyamine and fatty acid($C_1$~$C_{16}$).

The regulator (C) for a peak temperature of damping properties preferably has an amine value of 100 to 1,000, in view of compatibility with the polymer, (A), more preferably 350 to 450. The amine value is defined as a concentration of amine measured by titrating a basic amine in 1 g of a sample with HCl (0.5 mo/l). The value is calculated according to the following formula.

$$\text{Amine value[mgKOH/g]} = (A \times f \times 28.05)/S$$

A: volume of HCl needed for titration (ml)
f: factor of HCl
S: sample amount (g)

The regulator (C) for a peak temperature of damping properties is preferably present in a proportion of 5 to 200 parts, more preferably 5 to 50 parts, based on 100 parts of the polymer (A).

Further, the high damping material composition of the present invention may contain a damping property imparting agent (D) for making a peak temperature of a damping property lower, which comprises at least one of an acrylic monomer and an acrylic oligomer. By using the damping property imparting agent (D), it becomes possible to design a material having a peak temperature suitable for the range of temperatures for the intended use while holding a high tan δ.

Examples of the acrylic monomer include ethyleneoxide-modified bisphenol A diacrylate, ethyleneoxide-modified triacrylate isocyanurate, di-trimethiylolpropane-tetraacrylate and pentaerythrytol tetraacrylate. These, may be used either alone or in combination.

Examples of the acrylic oligomer include monohydroxyethylacrylate phthalate and polyester acrylate. These may be used either alone or in combination.

The damping property imparting agent (D) is preferably present in a proportion of 5 to 200 parts, more preferably 5 to 50 parts, based on 100 parts of the polymer (A).

Still further, the high damping material composition of the present invention may contain a specific acidic organic compound (E). The specific acidic organic compound (E) can provide an appropriate, acidity for the formulation ingredients and inhibit a decline of tan δ with time. When the high damping material composition contains the acidic organic compound (E) available at a relatively low price, the formulation amount of the damping property imparting agent (B) can be reduced so that the production cost is lowered.

The specific acidic organic compound (E) to be herein used is at least one of naphthenic acid and a plant organic acid. Examples of the plant organic acid include rohodinic acid, abiepic acid and neo-abiepic acid.

The acidic organic compound (E) is preferably present in a proportion of 5 to 100 parts, more preferably 5 to 50, based on 100 parts of the polymer (A).

Moreover, the high damping material composition of the present invention may contain a specific amorphous resin (F) for making the specific polymer (A) compatible with the damping property imparting agent (B). Where the high damping material composition contains the amorphous resin (F), it prevents the damping property imparting agent (B) from being deposited or crystallized and disperses it in the polymer (A) for a long time. Thus, an excellent damping capacity can be permanently maintained.

The amorphous resin (F) to be herein used is at least one, selected from the group consisting of coumarine resin, phenol resin, ketone resin, dicyclopentadiene (DCPD) resin, maleic resin, esterified rosin, epoxy resin, urea resin and melamine resin.

The amorphous resin (F) is preferably present in a proportion of 10 to 300 parts, more preferably 10 to 100, based on 100 parts of the polymer (A).

Furthermore, the high damping material composition of the present invention may contain a specific plasticizer (G). When the high damping material composition contains the plasticizer (G), the formulation amount of the damping property imparting agent (B) can be reduced, resulting in a cost reduction of materials.

The plasticizer (G) to be herein used is at least one of dibutyl phthalate (DBP) and dicyclohexyl phthalate (DCHP).

The plasticizer (G) is preferably present in a proportion of 5 to 100 parts, more preferably 5, to 50, based on 100 parts of the polymer (A).

Further, the high damping material composition of the present invention may contain a specific crosslinking agent (H) and/or a crosslinking accelerator. Where the high damping material composition contains the crosslinking agent (H) and the crosslinking accelerator, it becomes possible to make a hydrogen bond (pseudo crosslinking) of the polar side chain of the polymer (A) to the specific damping property imparting agent (B), resulting in exhibition of a high damping property. In addition, a crosslinking is formed in the side chain by a covalent bond, and thus a permanent compression set property can remarkably be improved.

The crosslinking agent (H) to be herein used is at least one selected from the group consisting of a triazine crosslinking agent, a metal soap crosslinking agent, an amine crosslinking agent, a carbamate crosslinking agent, an imidazol crosslinking agent and a sulfur crosslinking agent.

Examples of the triazine crosslinking agent include, 2,4, 6-trimercapto-S-triazine.

Examples of the metal soap crosslinking agent include potassium stearate represented by the formula $CH_3(CH_2)_{16}COOK$ and sodium stearate represented by the formula $CH_3(CH_2)_{16}COONa$.

Examples of the amine crosslinking agent include hexamethylenediamine carbamate represented by the formula $H_3{}^+N(CH_2)_6NHCO_2{}^-$, ammonium, benzoate, a substituted diphenylamine represented by the following formula;

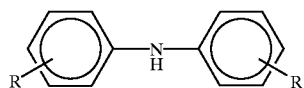

(I)

(wherein R is an alkyl group having 7 to 9 carbon atoms, and each R may be the same or different). These may be used either alone or in combination.

Examples of the carbamate crosslinking agent include zinc dimethyldithiocarbamate and zinc di-n-butyldithiocarbamate. These may be used either alone or in combination, Examples of the imidazol crosslinking agent include N,N'-di-ortho-tolylguanidine.

Examples of the sulfur crosslinking agent include sulfur, 2-mercaptoimidazoline and dipentamethylenethiuram pentasulfide.

Examples of the crosslinking accelerators used along with the crosslinking agent (H) include N,N'-diethylthiourea, ferric dimethyl dithiocarbamate and beef tallow fatty acid soda soap.

The crosslinking agent (H) and the crosslinking accelerator are preferably present in a total amount of 0.5 to 20 parts, more preferably 1.5 to 5 parts based on 100 parts of the polymer (A). If the proportion is less than 0.5 parts, a crosslinking proportion by the covalent bond becomes so small that an improved permanent compression set property is not expected. If the proportion is more than 20 parts, the crosslinking proportion becomes so large that an impact resilience becomes strong, resulting in a possible loss of the high damping property.

Furthermore, the high damping material composition may contain a specific foaming agent (I). The foaming agent (I) is thermally decomposed at a decomposition temperature (gas-generation temperature) to generate a gas and to form a cell structure in the polymer (A), so that impact absorbing performance against a light load can be enhanced. In addition, the high damping material composition has a lower specific gravity due to the cell structure, and thus the cost for materials can be reduced.

Usable as the foaming agent (I) is at least one selected from the group consisting of dinitrosopentamethylenetetramine (DPT), azodicarbonamide (ADCA), p,p'-oxybis (benzene sulfonyl hydrazide) (OBSH), p-toluenesulfonyl hydrazide (TSH), p-toluenesulfonyl acetonehydrazone and hydrazodicarbonamide (HDCA) described by the following formulae (a) to (f).

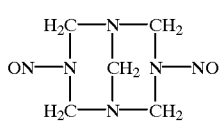

(a)

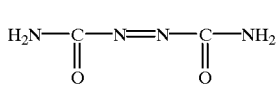

(b)

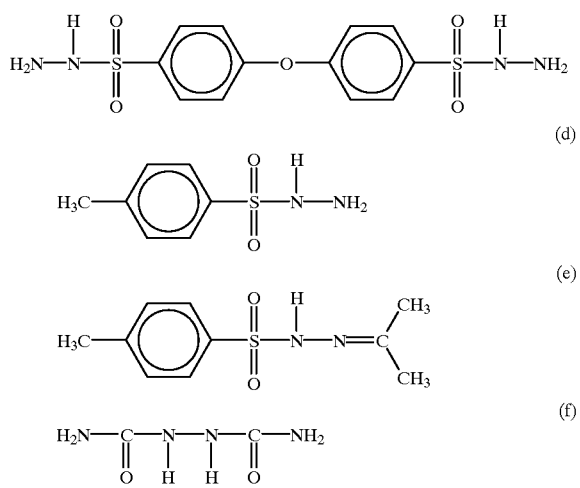

The foaming agent (I) is preferably present in a proportion of 5 to 40 parts, more preferably 5 to 20 parts based on 100 parts of the polymer (A). If the proportion is less than 5 parts, sufficient impact absorbing performance cannot be obtained against a light load due to a low expansion ratio. If the proportion exceeds 40 parts, the decomposition period of the foaming agent (I) becomes too long, so that foaming failure may occur.

Preferably usable as the foaming agent (I) are those having a decomposition temperature (gas-generation temperature) in the approximately game range of a vulcanization temperature of the polymer (A). Where such a foaming agent is used, the foaming agent (I) is thermally decomposed to generate a gas during the process of vulcanization of the polymer (A). Thus, the cell structure is formed in the polymer (A).

When a foaming agent having a decomposition temperature higher than the vulcanization temperature of the polymer (A) is used, it is preferred that a foaming aid is used therewith. The foaming aid can decrease the decomposition temperature of the foaming agent (I). Consequently, the decomposition temperature of the foaming agent can be adjusted approximately to the vulcanization temperature of the polymer (A).

Examples of a foaming aid include a urea foaming aid, a metal oxide foaming aid, a metal soap foaming aid and a salicylic acid foaming aid. These may be used either alone or in combination. According to the foaming agent (I) utilized, the most suitable foaming aid is selected.

Examples of the metal oxide foaming aids include zinc oxide (II). Examples of the metal soap foaming aid include calcium stearate. Examples of the salicylic acid foaming aid include salicylic acid.

The weight ratio of the foaming agent (I) to the foaming aid is suitably determined by the decomposition temperature (gas generation temperature) and the gas volume generated from decomposition of the foaming agent (I). However, generally the foaming agent (I) and the foaming aid are present in a weight ratio of 1:1. When the foaming agent (I) and the foaming aid are used together, the foaming agent (I) and the foaming aid are present in a total amount of 5 to 40 parts, more preferably 8 to 20 parts, based on 100 parts of the polymer (A). If the proportion is less than 5 parts, a sufficient impact absorbing performance cannot be obtained against a light load due to a low expansion ratio. If the proportion exceeds 40 parts, the decomposition period of the foaming agent, (I) becomes too long, so that foaming failure may occur.

In addition to the components described above, the high damping material composition of the present invention may, as required, contain a filler for enhancement of hardness, strength and processability, and/or for a weight increase. Examples of the filler, include an inorganic dust-size particle such as mica, talc, clay, and calcium carbonate, an organic dust-size particle such as cellulose powders, and wastepaper powders and a short fiber such as polyesters and acryls.

Further, optional additives such as a coloring agent (pigment, dye), a brightener, an anti-aging agent, a tackifier, a fire retardant additive, a process aid, an antiozonant, an anti-blocking agent, a weathering agent, a heat stabilizer, a dispersant, a compatibilizing agent, a surfactant, an antistat and a lubricant may be added to the high damping material composition of the present invention.

The high damping material composition of the present invention can be prepared, for example, by blending and kneading the components A and B, preferably the component C and the like in a designated manner.

Further, the high damping material composition may preferably be formed into a sheet in a designated manner such as press molding, and then used as a high damping sheet.

According to the present invention, the high damping sheet preferably has a crystallization inhibition layer on the surface thereof.

An exemplary method to form the crystallization inhibition layer is, for example, to first mix a platinum catalyst and the like with a dehydrogenating condensation reaction silane coupling agent and to uniformly apply the resulting mixture solution on the surface of the sheet by means of a brush and the like, and then to heat the sheet for coupling reaction for curing.

The silane coupling is not limited to a dehydrogenating condensation reaction silane coupling agent, but examples thereof include silane coupling agents of the acetic acid elimination reaction type, the oxime elimination reaction type, the amine elimination reaction type, the alcohol elimination reaction type, the alcohol elimination condensation reaction type, the hydroxylamine elimination condensation reaction type and the addition reaction type.

The thus obtained crystallization inhibition layer of the high damping sheet has a thickness of 0.1 to 50 μm, preferably 0.1 to 5 μm.

The high damping sheet formed with the crystallization inhibition layer on the surface thereof has an excellent adhesive property and has the damping property imparting agent and the like completely blocked from atmospheric air, as compared with a damping sheet formed with a film by coating, or affixed with an air-shield sheet. Thus, without crystallization or bleeding of the damping property imparting agent, the high damping sheet, according to the present invention, can ensure a stable and higher damping property.

FIRST EMBODIMENT EXAMPLES AND COMPARATIVE EXAMPLES

The present invention will be hereinafter be explained by way of Examples and Comparative Examples thereof.

Examples 1a–14a and Comparative Examples 1a and 2a

Prior to the preparation of the Examples and Comparative Examples, the following materials were prepared.

[Specific Polymer (A)]

Acrylic rubber (NIPOL AR51 available from Nippon Zeon Co.)

[Polymer having an acidic polar side chain]

Chlorinated polyethylene (CPE) (ELASLENE 401A available from Showa Denko K.K)

[Damping property imparting agent (B) a comprising a hindered phenol compound]

① Tris-(3,5-di-t-butyl-4-hydroxybenzyl)-isocyanurate represented by the following formula (ADK STAB AO-20 available from Asahi Denka Kogyo K.K)

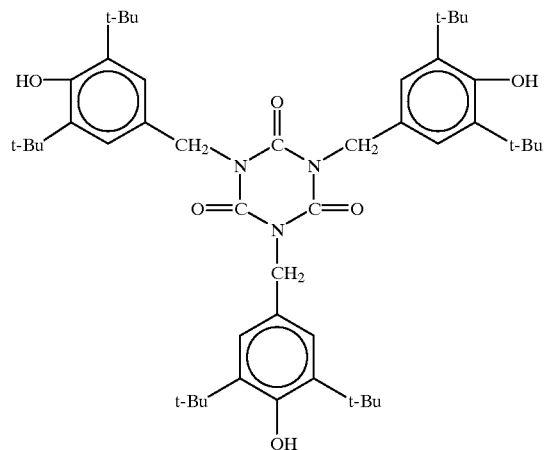

② 1,1,3-tris (5-t-butyl-4-hydroxy-2-methylphenyl) butane represented by the following formula (ADK STAB AO-30 available from Asahi Denka Kogyo K.K.)

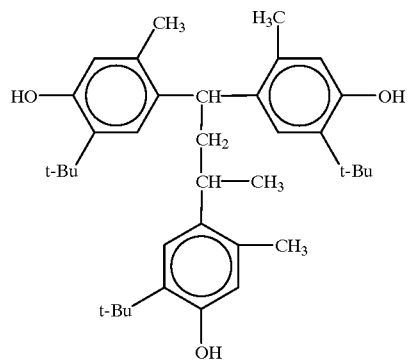

③ 4,4'-butylidenbis(3-methyl-6-t-butylphenol) represented by the following formula (ADK STAB AO-40 available from Asahi Denka Kogyo K.K.,)

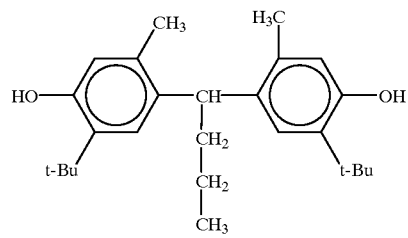

④ Pentaerythrityl-tetrakis[3-(3,5-di-t-butyl-4-hydroxyphenyl)propionate] represented by the following formula (ADK STAB AO-60 available from Asahi Denka Kogyo K.K.)

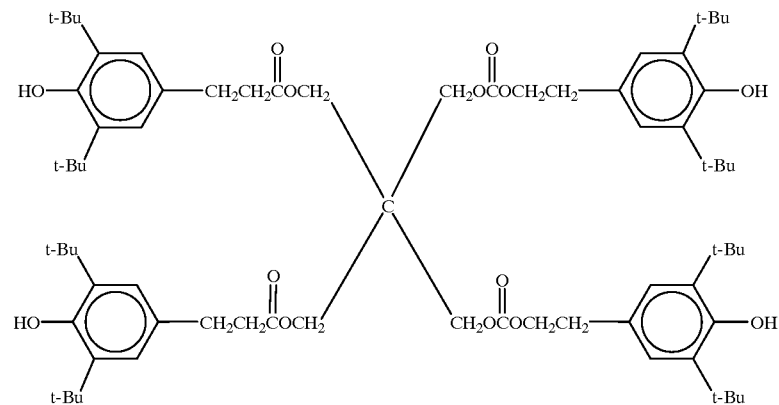

⑤ Triethylene glycol-bis[3-(3-t-butyl-5-methyl-4-hydroxyphenyl)propionate] (ADK STAB AO-70 available from Asahi Denka Kogyo K.K.)

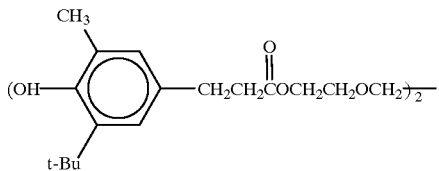

⑥ 3,9-bis[1,1-dimethyl-2-[(3-t-butyl-4-hydroxy-5-methylphenyl)propionyloxy]ethyl]-2,4,8,10-tetraoxaspiro[5.5]undecane represented by the following formula (ADK STAB AO-80 available from Asahi Denka Kogyo K.K.)

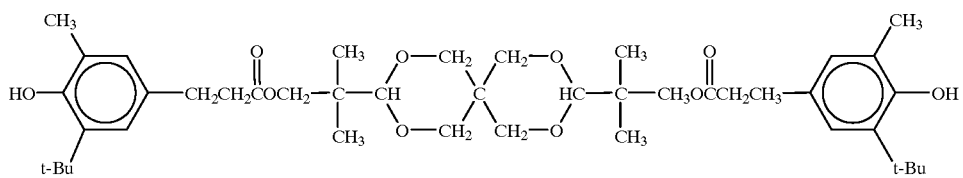

⑦ 1,6-hexanediol-bis[3-(3,5-di-t-butyl-4-hydroxyphenyl)propionate] represented by the following formula (IRGANOX259 available from Ciba-Geigy AG)

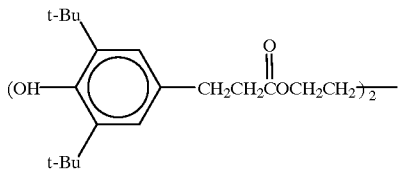

⑧ 2,2-thio-diethylenebis[3-(3,5-di-t-butyl-4-hydroxyphenyl)propionate] represented by the following formula (IRGANOX1035FF available from Ciba-Geigy AG)

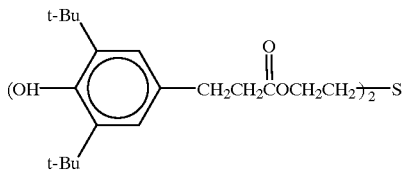

⑨ A butylated product of p-cresol and dicyclopentadiene represented by the following formula (NOCRAC PBK available from Ouchi Shinko Chemical Industrial Co., Ltd.)

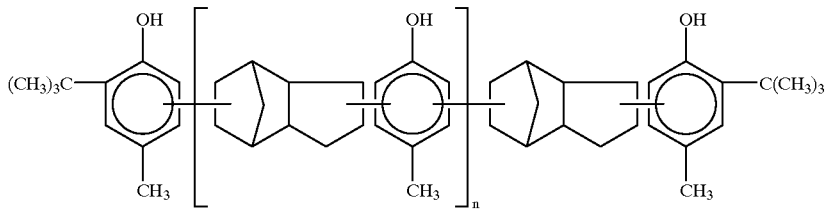

⑩ 2,5-di-t-amylhydroquinone represented by the following formula (NOCRAC DAH available from Ouchi Shinko Chemical Industrial Co., Ltd.)

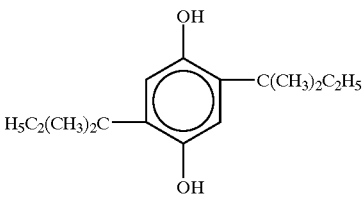

⑪ 1-[2-{3-(3,5-di-t-butyl-4-hydroxyphenyl)propionyloxy}ethyl-4-{3-(3,5-di-t-butyl-4-hydroxyphenyl)propionyloxy}-2,2,6,6-tetramethylpiperidine represented by the following formula (SANOL LS-2626 available from Sankyo Chemical Co. Ltd.)

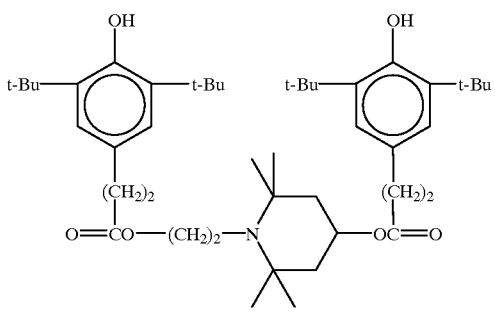

⑫ 2,2'-methylenebis(4-ethyl-6-t-butylphenol) represented by the following formula (NOCRAC NS-5 available from Ouchi Shinko Chemical Industrial Co., Ltd.)

⑬ 2,2'-methylenebis(4-methyl-6-t-bultylphenol) represented by the following formula (NOCRAC NS-6 available from Ouchi Shinko Chemical Industrial Co., Ltd.)

For preparation of the Examples and Comparative Examples, the materials were blended in accordance with formulations shown in Tables 1 and 2, and then mixed by means of a twin roll mill at room temperature for about 15 to 20 minutes. The resulting mixtures were each filled into a designated mold and fusion-molded for about 10 minutes by means of a heat pressing machine at a temperature of not less than 20° C. over a fusion temperature of the damping property, imparting agent. Then, the resulting product was cooling-pressed by applying a face pressure of 130 kgf/cm² at 0° C. to obtain a sheet with a thickness of 2 mm.

The thus obtained sheets of Examples 1a to 14a and Comparative Examples 1a and 2a were each evaluated with respect of a tan δ peak value, a tan δ peak temperature and surface condition of each material. The results of the evaluations are together shown in Tables 1 and 2. The tan δ was measured by a spectrometer manufactured by Rheology Co. under a condition of 0.05% strain (constant) and 100 Hz of frequency (constant).

TABLE 1

| | EXAMPLES | | | | | | | (Parts) |
|---|---|---|---|---|---|---|---|---|
| | 1a | 2a | 3a | 4a | 5a | 6a | 7a | 8a |
| [Polymer] | | | | | | | | |
| NIPOLE AP 51 | 100 | 100 | 100 | 100 | 100 | 100 | 100 | 100 |
| ELASLEN 401A | — | — | — | — | — | — | — | — |
| [Hindered Phenol damping property imparting agent] | | | | | | | | |
| ADK STAB AO-20 | 50 | — | — | — | — | — | — | — |
| ADK STAB AO-30 | — | 50 | — | — | — | — | — | — |
| ADK STAB AO-40 | — | — | 50 | — | — | — | — | — |
| ADK STAB AO-60 | — | — | — | 50 | — | — | — | — |
| ADK STAB AO-70 | — | — | — | — | 50 | — | — | — |
| ADK STAB AO-80 | — | — | — | — | — | 50 | — | — |
| IRGANOX 259 | — | — | — | — | — | — | 50 | — |
| IRGANOX 1035FF | — | — | — | — | — | — | — | 50 |
| tan δ :right after pressing | 2.3 | 3.13 | 3.25 | 3.18 | 3.2 | 2.9 | 3.55 | 3.46 |
| tan δ :one month later | 2.18 | — | — | 2.86 | — | 3.01 | — | — |
| tan δ retention (%) | 95 | — | — | 90 | — | 104 | — | — |
| peak temperature (° C.) | 50 | 55 | 40 | 37 | 17 | 32 | 15 | 18 |
| surface condition of material | good | good | good | good | good | good | good | good |
| Comprehensive evaluation | ◎ | ◎ | ◎ | ○ | ◎ | ◎ | ◎ | ◎ |

TABLE 2

| | EXAMPLES | | | | | COMPARATIVE EXAMPLES | (Parts) |
|---|---|---|---|---|---|---|---|
| | 9a | 10a | 11a | 12a | 13a | 1a | 2a |
| [Polymer] | | | | | | | |
| NIPOLE AR 51 | 100 | 100 | 100 | 100 | 100 | 100 | — |
| ELASLEN 401A | — | — | — | — | — | — | 100 |
| [Hindered Phenol | | | | | | | |

TABLE 2-continued

|  | EXAMPLES | | | | | COMPARATIVE EXAMPLES (Parts) | |
| --- | --- | --- | --- | --- | --- | --- | --- |
|  | 9a | 10a | 11a | 12a | 13a | 1a | 2a |
| damping property imparting agent] | | | | | | | |
| NOXRACK PBK | 50 | — | — | — | — | — | — |
| NOCRACK DAH | — | 50 | — | — | — | — | — |
| SANOL LS-2626 | — | — | 50 | — | — | — | — |
| NOKRACK NS-5 | — | — | — | 50 | — | — | — |
| NOKRACK NS-6 | — | — | — | — | 50 | — | — |
| tan δ:right after pressing | 2.59 | 2.9 | 2.9 | 3.1 | 3.0 | 2.33 | 1 |
| tan δ:one month later | — | — | — | — | — | — | — |
| tan δ retention (%) | — | — | — | — | — | — | — |
| peak temperature (° C.) | 56 | 33 | 33 | 41 | 39 | 14 | 10 |
| surface condition of material | good | good | good | good | good | good | good |
| Comprehensive evaluation | ⊚ | ⊚ | ⊚ | ⊚ | ⊚ | X | X |

As can be understood from the results shown in Tables 1 and 2, the sheet of Example 1a exhibited almost as a high tan δ as that of Comparative Example 1a, and has an excellent retention ratio of tan δ, 95%, after one month from forming. The sheets of Example 2a to 13a exhibited higher tan δ peak values than those of Comparative Examples, and their tan δ peaks far exceeded a prescribed property (tan $\delta \geq 2.5$). Particularly, Example 6 had not only a tan δ peak value exceeding 2.5, but also an excellent retention ratio of tan δ, 104%. Further, Examples 5a, 7a and 8a had peak temperatures of ambient or room temperature (around 20° C.), and therefore they are excellent compositions and suitable for use in a room temperature environment. The other Examples have a little higher peak temperature than room temperature, and they are regarded relatively good.

Examples 14a–20a and Comparative Examples 3a and 4a

Prior to the preparation of the Examples and Comparative Examples, the following materials were prepared.
[Specific Polymer (A)]
① Ethylene-methacrylic copolymer (VAMAC DLS available from Du Pont Co.)
② Polyvinyl acetate (SAKNOL SN-10 available from Denkikagaku Kogyo K.K.)
[Damping property imparting agent (B) comprising a phosphite ester compound]
① Di(nonylphenyl)pentaerythritol diphosphite represented by the following formula (ADK STAB PEP-4C available from Asahi Denka Kyogyo K.K.)

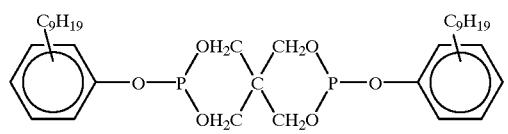

② Bis(2,4-di-t-butylphenyl)pentaerythritol diphosphite represented by the following formula (ADK STAB PEP-24G available from Asahi Denka Kyogyo K.K.)

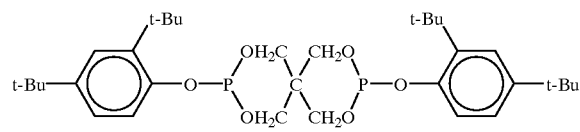

③ Hexa(tridecyl)-1,1,3-tris(2,methyl-4-hydroxy-5-t-butylphenydl)butanetriphosphite represented by the following formula (ADK STAB 522A available from Asahi Denka Kyogyo K.K.)

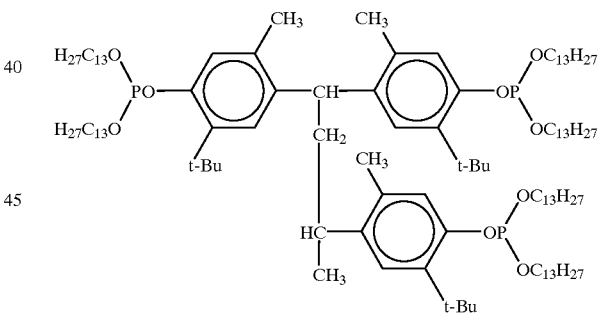

For preparation of the examples and Comparative Examples, the materials were blended in accordance with formulations shown in Table 3, and then mixed by means of a twin roll mill at room temperature for about 15 to 20 minutes. The resulting mixtures were each filled into a designated mold and fusion-molded for about 10 minutes by means of a heat pressing machine at a temperature of not less than 20° C. over a fusion temperature of the damping property imparting agent. Then, the mixture was cooling-pressed by applying a face pressure, of 130 kgf/cm$^2$ at 0° C. to obtain a sheet with a thickness of 2 mm.

The thus obtained sheets of Examples 15a to 21a and Comparative Examples 3a and 4a were each evaluated in the same manner as Example 1a with respect of a tan δ peak and a tan δ peak temperature. The results of the evaluations are together shown in Tables 3.

TABLE 3

|  | EXAMPLES | | | | | | | COMPARATIVE EXAMPLES (Parts) | |
| --- | --- | --- | --- | --- | --- | --- | --- | --- | --- |
|  | 14a | 15a | 16a | 17a | 18a | 19a | 20a | 3a | 4a |
| [Polymer] | | | | | | | | | |
| NIPOLE AR 51 | 100 | 100 | 100 | 100 | 100 | — | — | — | — |
| VAMAC DLS | — | — | — | — | — | 100 | — | 100 | — |
| SAKNOL SN-10 | — | — | — | — | — | — | 100 | — | 100 |
| [Phosphite Ester damping property imparting agent] | | | | | | | | | |
| ADK STAB PEP-4C | 50 | — | — | — | — | — | — | — | — |
| ADK STAB PEP-24G | — | 50 | — | 30 | 70 | 50 | 50 | — | — |
| ADK STAB 522A | — | — | 50 | — | — | — | — | — | — |
| tan δ:right after pressing | 2.89 | 2.96 | 2.54 | 2.89 | 3.03 | 2.47 | 3.35 | 2.13 | 2.96 |
| peak temperature (° C.) | 8 | 31 | 13 | 25 | 36 | 17 | 80 | 1 | 63 |
| Comprehensive evaluation | ⊚ | ⊚ | ⊚ | ⊚ | ⊚ | ⊚ | ⊚ | X | Δ |

As can be understood from the results shown in Table 3, the sheets of Example 15a to 21a had a tan δ of greater than the prescribed property (tan δ≧2.5) and had a peak temperature of ambient or room temperature (around 20° C.).

Described in FIG. 1 are temperature changer of tan δ of Examples 14a to 16a and Comparative Example 1a. As evident from FIG. 1, Examples 14a to 16a exhibited much higher tan δ peak values than Comparative Example 1a.

Figure 2:
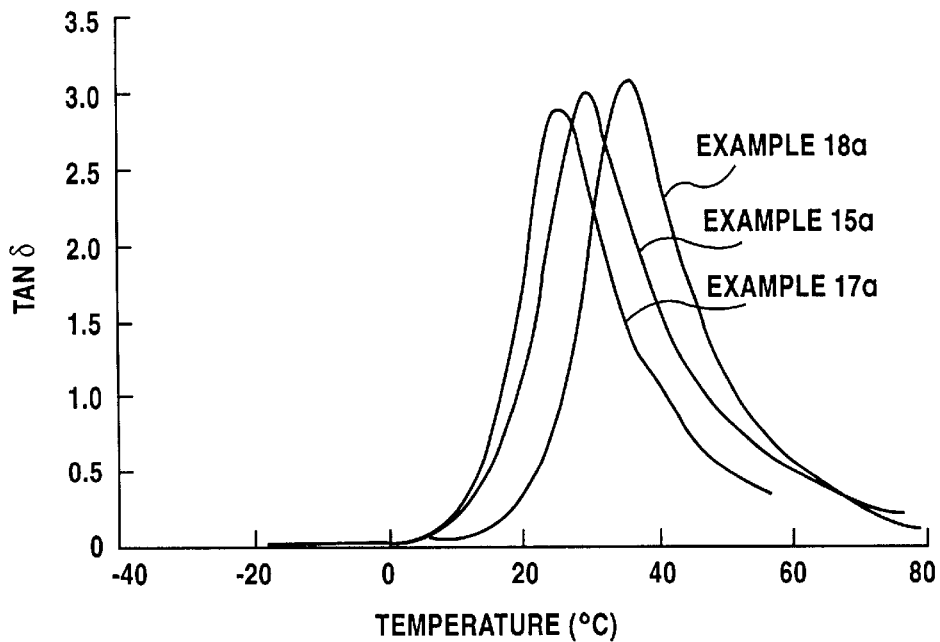
Figure 3:
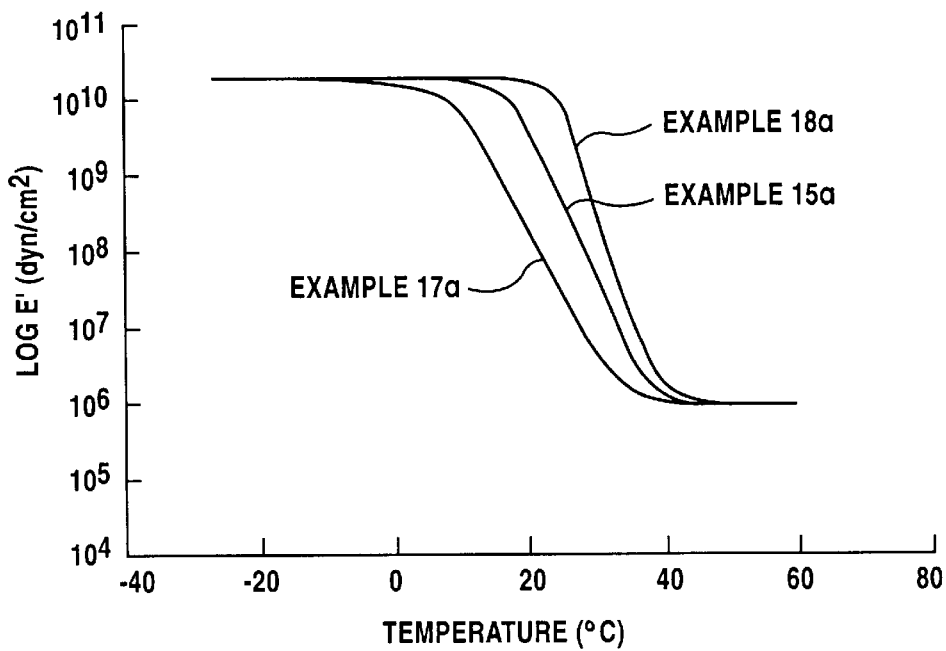

Further, FIG. 2 shows temperature changes of tan δ of Examples 15a, 17a and 18a, and FIG. 3 shows temperature changes of Young's modulus thereof.

In comparison between Example 17a and 18a in FIG. 2, it is understood that as the mixing amount of the damping property imparting agent was increased, the tan δ became higher and the peak temperature became higher. Conversely, in comparison between Example 15a and 17a, it is understood that as the mixing amount thereof was decreased, the tan δ became a little lower and the peak temperature became much closer to room temperature. Moreover, in general, as a log E' has a sharper gradient, the tan δ becomes higher. In comparison between Example 15a and 18a in FIG. 3, it is understood that as the mixing amount of the damping property imparting agent was increased, the log E' had a sharper gradient and the tan δ became higher. On the other hand, in comparison between Example 15a and 17a, it is understood that as the mixing amount thereof was decreased, the log E' had a gentle gradient and the tan δ became lower.

Examples 21a–27a

Prior to the preparation of the Examples, the following materials were prepared.

[Damping property imparting agent (B) comprising a basic compound containing nitrogen]

① N,N'-diphenyl guanidine, a guanidine vulcanization accelerator represented by the following formula (SANCELER D-G available from Sanshin Chemical Industries)

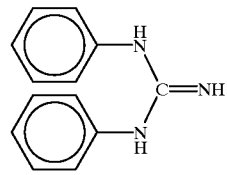

② N,N'-diortho-tolylguanidine, a guanidine vulcanization accelerator represented by the following formula (SANCELER-DT available from Sanshin Chemical Industries)

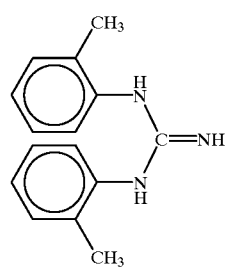

③ Tris(2,3-dibromopropyl isocyanurate, an isocyanurate fire retardant additive represented by the following formula (TAIC-6B available from Nippon Kasei Chemical Co., Ltd.)

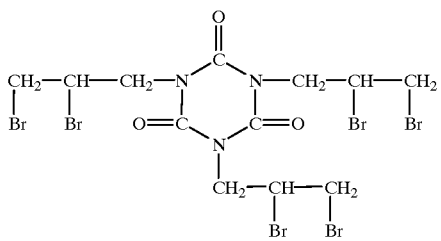

④ 8-acetyl-3-dodecyl-7,7,9,9-tetramethyl-1,3,8-triazaspiro[4.5]decane-2,4-dione represented by the following formula (SANOL LS-440 available from Sankyo Chemical Co. Ltd.)

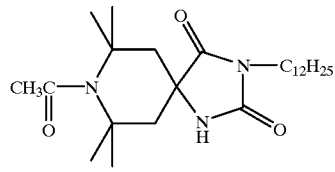

[Damping property imparting agent (B) comprising a hindered amine compound]

For preparation of the Examples, the materials were blended in accordance with formulations shown in Table 4, and then mixed by means of a twin roll mill at room temperature for about 15 to 20 minutes. The resulting mixtures were each filled into a designated mold and fusion-molded for about 10 minutes by means of a heat pressing machine at a temperature of not less than 20° C. over a fusion temperature of the damping property imparting agent. Then, the mixture was cooling-pressed by applying a face pressure of 130 kgf/cm$^2$ at 0° C. to obtain a sheet with a thickness of 2 mm.

The thus obtained sheets of Examples 21a to 27a were evaluated in the same manner as Example 1a with respect of a tan δ peak and a tan δ peak temperature. The results of the evaluations are together shown in Table 4.

TABLE 4

|  | EXAMPLES | | | | | | (parts) |
| --- | --- | --- | --- | --- | --- | --- | --- |
|  | 21a | 22a | 23a | 24a | 25a | 26a | 27a |
| [Polymer] | | | | | | | |
| NIPOLE AR 51 | 100 | 100 | 100 | — | — | 100 | 100 |
| VAMAC DLS | — | — | — | 100 | — | — | — |
| SAKNOL SN-10 | — | — | — | — | 100 | — | — |
| [Damping property imparting agent (nitrogen-containing basic compound)] | | | | | | | |
| SANSELLER D-G | 50 | — | — | — | — | — | — |
| SANSELLER DT | — | 50 | — | — | — | — | — |
| TAIC-6B | — | — | 50 | 50 | 50 | — | — |
| SANOL LS-440 | — | — | — | — | — | 50 | — |
| [Hindered Phenol damping property imparting agent] | | | | | | | |
| ADK STAB LA-57 | — | — | — | — | — | — | 50 |
| tan δ:right after pressing | 3.58 | 2.96 | 2.76 | 2.45 | 3.3 | 2.6 | 2.63 |
| peak temperature (° C.) | 25 | 21 | 25 | 10 | 71 | 19 | 31 |
| Comprehensive evaluation | ◎ | ◎ | ◎ | ◎ | ◎ | ○ | ◎ |

Tetrakis(2,2,6,6-tetramethyl-4-piperidyl)-1,2,3,4-butanetetracarboxylate, a hindered amine light stabilizer represented by the following formula (ADK STAB LA-57 available from Asahi Denka, Kogyo K.K.)

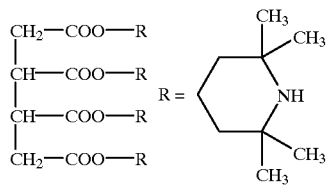

As can be understood from the results shown in Table 4, the sheets of Examples 21a to 27a almost all satisfied the prescribed property (tan δ≧2.5), and most of the Examples except some had peak temperatures generally of or room temperature (around 20° C.).

Examples 28a–34a

Prior to the preparation of the Examples, the following materials were prepared.

[Damping property imparting agent (B) comprising a hindered phenol compound]

4,4'-thiobis(3-methyl-6-t-butylphenol) represented by the following formula (NOCRAC 300 available from Ouchi Shinko Chemical Industrial Co., Ltd.)

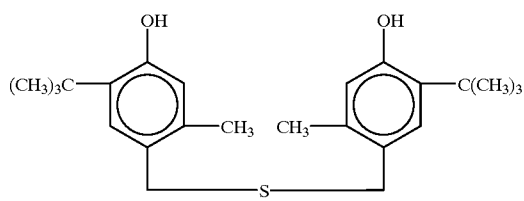

For preparation of the Examples, the materials were blended in accordance with formulations shown in Table 5, and then mixed by means off a twin roll mill at room temperature for about 15 to 20 minutes. The resulting mixtures were each filled into a designated mold and fusion-molded for about 10 minutes by means of a heat pressing machine at a temperature of not less than 20° C. over a fusion temperature of the damping property imparting agent. Then, the mixture was cooling-pressed by applying a face pressure of 130 kgf/cm² at 0° C. to obtain a sheet with a thickness of 2 mm.

The thus obtained sheets of Examples 28a to 34a were each evaluated in the same manner as Example 1a with respect of a tan δ peak value, a tan δ peak temperature and surface condition of each material. The results of the evaluations are together shown in Table 5.

As can be understood from the results shown in Table 5, the sheets of Examples 28a to 34a satisfied the prescribed property (tan δ≧2.5) and had peak temperatures generally ambient to room temperature (around 20° C.).

Example 35a–43a

Prior to the preparation of the Examples, the following materials were prepared.

[Damping property imparting agent (B) comprising a hindered amine compound]

① A condensate of 1,2,3,4-butanetetracarboxylic acid, 2,2,6,6-tetramethyl-4-piperidinol and β, β, β', β'-tetramethyl-3,9-(2,4,8,10-tetraoxyaspiro[5.5]undecane) diethanol represented by the following formula (ADK STAB LA-63P available from Asahi Denka Kogyo K.K.)

TABLE 5

| | EXAMPLES | | | | | | | (parts) |
|---|---|---|---|---|---|---|---|---|
| | 28a | 29a | 30a | 31a | 32a | 33a | 34a | |
| [Polymer] | | | | | | | | |
| NIPOLE AR 51 | 100 | 100 | 100 | 100 | 100 | 100 | 100 | |
| [Hindered Phenol damping property imparting agent] | | | | | | | | |
| IRGANOX 259 | — | — | — | — | 25 | — | 35 | |
| IRGANOX 1035FF | 20 | 15 | — | 35 | 25 | 40 | — | |
| ADK STAB AO-40 | — | — | 25 | — | — | — | — | |
| ADK STAB AO-70 | — | — | — | 15 | — | — | 15 | |
| ADK STAB AO-80 | 30 | 35 | — | — | — | — | — | |
| NOCRAC 300 | — | — | 25 | — | — | — | — | |
| NOCRAC PBK | — | — | — | — | — | 11 | — | |
| tan δ:right after pressing | 2.62 | 2.92 | 3.36 | 3.17 | 3.27 | 2.95 | 3.25 | |
| tan δ:one month later | 2.95 | 2.97 | 3.29 | 3 | 3.08 | 2.76 | 2.52 | |
| tan δretention (%) | 113 | 102 | 98 | 95 | 94 | 94 | 78 | |
| peak temperature (° C.) | 29.3 | 30.8 | 42 | 19.2 | 18.2 | 24.5 | 16.2 | |
| surface condition of material | good | good | good | good | good | good | good | |
| Comprehensive evaluation | ◎ | ◎ | ◎ | ◎ | ◎ | ◎ | ○ | |

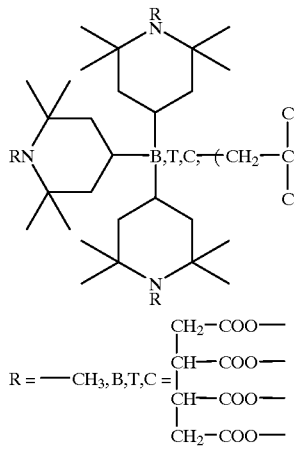

② 3-dodecyl-1-(2,2,6,6-tetramethyl- 4-piperidinyl) pyrrolidine-2,5-dione represented by the following formula (Sanduvor 3055 available from Clariant Japan K.K.)

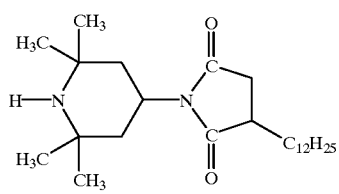

③ A mixture of β-alanine, N-(2,2,6,6-tetramethyl-4-piperidinyl)-dodecylester and β-alanine, N-(2,2,6,6-tetramethyl-4-piperidinyl)-tetradecylester represented by the following formula (Sanduvor 3052 available from Clariant Japan K.K.)

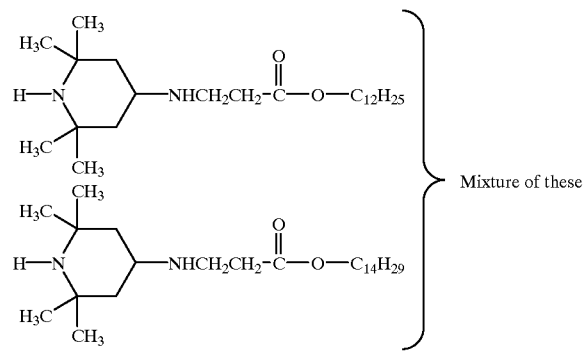

④ N-acetyl-3-dodecyl-1-(2,2,6,6,-tetramethyl-4-piperidinyl)pyrrolidine-2,5-dione represented by following formula (Sanduvor 3058 available from Claiant Japan Co.)

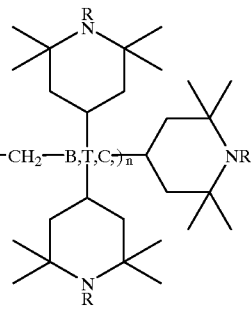

[Damping property imparting agent (B) comprising a basic compound containing nitrogen]

① N,N'-diphenyl guanidine represented by the following formula (D available from BASF Co.)

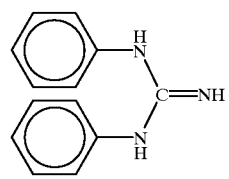

② polyethylene-imine represented by the following formula (G335 available from BASF Co.)

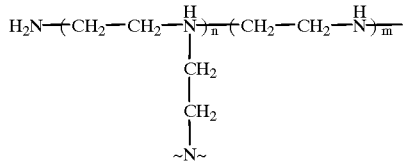

For preparation of the Examples, the materials were blended in accordance with formulations shown in Table 6, and then mixed by means of a twin roll mill at room temperature for about 15 to 20 minutes, The resulting mixtures were each filled into a designated mold and fusion-molded for about 10 minutes by means of a heat pressing machine at a temperature of not less than 20° C. over a fusion temperature of the damping property imparting agent. Then, the mixture was cooling-pressed by applying a face pressure of 130 kgf/cm² at 0° C. to obtain a sheet with a thickness of 2 mm.

The thus obtained sheets of Examples 35a to 43a were each evaluated in the same manner as Example 1a with respect of a tan δ peak, a tan δ peak temperature and surface condition of each material. The results of the evaluations are together shown in Table 6.

temperature for about 15 to 20 minutes. The resulting mixtures were each filled into a designated mold and fusion-molded for about 10 minutes by means of a heat pressing

TABLE 6

|  | EXAMPLES | | | | | | | | | (parts) |
|---|---|---|---|---|---|---|---|---|---|---|
|  | 35a | 36a | 37a | 38a | 39a | 40a | 41a | 42a | 43a |
| [Polymer] | | | | | | | | | |
| NIPOLE AR 51 | 100 | 100 | 100 | 100 | 100 | 100 | 100 | 100 | 100 |
| [Hindered phenol damping property imparting agent] | | | | | | | | | |
| IRGANOX 1035FF | — | — | — | — | — | 40 | — | — | — |
| IRGANOX 259 | — | — | — | — | — | — | — | — | 40 |
| ADK STAB AO-40 | — | — | — | — | — | — | — | 40 | — |
| ADK STAB AO-60 | — | — | — | — | — | — | 40 | — | — |
| ADK STAB AO-80 | 40 | 40 | 40 | 40 | 40 | — | — | — | — |
| [Hindered amine damping property imparting agent] | | | | | | | | | |
| ADK STAB LA-63P | 7 | — | — | — | — | — | — | — | — |
| Sanduvor 3065 | — | 10 | — | — | — | — | — | 10 | — |
| Sanduvor 3052 | — | — | 10 | — | — | — | — | — | — |
| Sanduvor 3058 | — | — | — | 10 | — | — | — | — | — |
| [Damping property imparting agent (nitrogen-containing basic compound)] | | | | | | | | | |
| D | — | — | — | — | 10 | — | — | — | — |
| G35 | — | — | — | — | — | 10 | 10 | — | 10 |
| tan δ:right after pressing | 2.76 | 3.01 | 2.96 | 3.08 | 3.02 | 2.91 | 2.59 | 3.26 | 3 |
| tan δ:one month later | 2.82 | 3.07 | 2.97 | 3.02 | 2.62 | 2.97 | 2.51 | 2.76 | 2.36 |
| tan δretention (%) | 102 | 102 | 100 | 98 | 87 | 102 | 97 | 85 | 79 |
| peak temperature (° C.) | 33.7 | 30.4 | 27 | 28.9 | 31 | 18 | 34.7 | 36 | 17 |
| surface condition of material | good | good | good | good | good | good | good | good | good |
| Comprehensive evaluation | ◉ | ◉ | ◉ | ◉ | ○ | ◉ | ◉ | ○ | ○ |

As can be understood from there results shown in Table 6, the sheets of Examples 35a to 43a each exhibited an excellent performance, which had a tan δ exceeding the prescribed property (tan δ≧2.5) right after pressing. Further, Examples 35a to 38a, 40a and 41a each had a tan δ retention ratio of greater than 95%, offering a superior performance. Moreover, Examples 40a and 43a each had a peak temperature of about 20° C., which is suitable for use in a room temperature environment, and thus they are excellent compositions. The Examples except 40a and 43a had a peak temperature of about 30° C., a little higher than room temperature, which have little effect on use in a room temperature environment, and therefore they are regarded as excellent compositions.

Example 44a–46a

Prior to the preparation of the Examples, the following materials were prepared.
[Damping property imparting agent (B) comprising a phosphate ester compound]

Triphenyl phosphate (TPP available from Daihachi Chemical Industry Co., Ltd.)

For preparation of the Examples, the materials were blended in accordance with formulations shown in Table 7, and then mixed by means of a twin roll mill at room machine at a temperature of not less than 20° C. over a fusion temperature of the damping property imparting agent. Then, the mixture was cooling-pressed by applying a face pressure of 130 kgf/cm$^2$ at 0° C. to obtain a sheet with a thickness of 2 mm.

The thus obtained sheets of Examples 44a to 46a were each evaluated in the same manner as Example 1a with respect of a tan δ peak, a tan δ peak temperature and surface condition of each material. The results of the evaluations are together shown in Table 7.

TABLE 7

|  | EXAMPLES | (part) | |
|---|---|---|---|
|  | 44a | 45a | 46a |
| [Polymer] | | | |
| NIPOLE AR 51 | 100 | 100 | 100 |
| [Hindered phenol damping property imparting agent] | | | |
| ADK STAB AO-60 | 40 | — | — |
| ADK STAB AO-80 | — | 40 | 40 |

TABLE 7-continued

| | (part) EXAMPLES | | |
|---|---|---|---|
| | 44a | 45a | 46a |
| [Phosphate ester damping property imparting agent] | | | |
| TPP | 10 | 10 | 50 |
| tanδ: right after pressing | 2.82 | 2.85 | 2.85 |
| tanδ: one month later | 2.83 | 2.75 | 2.75 |
| tanδ retention (%) | 100 | 96 | 98 |
| peak temperature (° C.) | 28 | 26 | 0 |
| surface condition of material | good | good | good |
| Comprehensive evaluation | ◉ | ◉ | ◉ |

As can be understood from the results shown in Table 7, Examples 44a and 45a containing two kinds of damping property imparting agents, a hindered phenol compound and a phosphate ester compound, each exhibited an excellent performance, which had a tan δ exceeding the prescribed property (tan δ≧2.5). Further, Examples 44a and 45a had a tan δ retention ratio of 100% and 96%. Both Examples could sufficiently hold a tan δ immediately after pressing. Moreover, Examples 44a and 45a had a peak temperature of 28° C. and 26° C., which were on the order of 20° C., and therefore, they are suitable for use in a room temperature environment.

While Example 46a containing one kind of damping property imparting agent, a phosphate ester compound, also exhibited an excellent performance, which had a tan δ exceeding the prescribed property (tan δ≧2.5). It had a tan δ retention ratio of 98%, and thus the example could sufficiently hold a tan δ immediately after pressing. It had a peak temperature of 0° C. Therefore, Example 46a is suitable for use under an environment of a temperature lower than room temperature.

In view of the foregoing, where more than 2 kinds of damping property imparting agents were mixed, as a matter of course, the composition, of the present invention can exhibit a high tan δ. In addition, a multiple-component system can prevent the damping property imparting agent from being crystallized and offer a remarkable effect to inhibit a decline of tan δ with time. The composition containing more than two kinds of damping property imparting agents can not only prevent crystallization but also has an effect on controlling the peak temperature.

SECOND EMBODIMENT

Examples 1b–10b

Prior to the preparation of the Examples, the following materials were prepared.
[Specific Polymer (A)]
Ethylene-methyl acrylate copolymer (BAYMAC GLS available from Showa Denko Du Pont)
[Damping property imparting agent (a) comprising a hindered amine compound]
① ADX STAB T-706 (Asahi Denka Kogya K.K.) [molecular weight: 1700]
② ADK STAB T-707 (Asahi Denka Kogyo K.K.) [molecular weight: 1500]
③ ADK STAB T-708 (Asahi Denka Kogyo K.K.) [molecular weight: 1200]
④ ADK STAB T-717 (Asahi Denka Kogyo K.K.) [molecular weight: 1000]
⑤ ADK STAB LA-68LD (Asahi Denka Kogyo K.K.) [molecular weight: 1900]

The above hindered amine compounds ① to ⑤ have as a basic structure a condensate of 1,2,3,4-butanetetracarboxylic acid, 2,2,6,6-tetramethyl-4-piperidinol and β,β,β',β'-tetramethyl-3,9-(2,4,8,10-tetraoxyaspiro[5.5]undecane)diethanol, and they have different condensation ratios and molecular weights from each other.

For preparation of the Examples, the materials were blended in the ratio as described in Tables 8 and 9, and then mixed by means of a twin roll mill at room temperature for about 15 to 20 minutes. The resulting mixtures were each filled into a designated mold and fusion-molded at 170° C. for about 10 minutes by means of a heat pressing machine. Then, the mixture was cooling-pressed by applying a face pressure of 130 kgf/cm$^2$ at 0° C. to obtain a sheet with a thickness of 2 mm.

The thus obtained sheets of Examples 1b to 10b were each evaluated in the same manner as Example 1a with respect of a tan δ peak value and a tan δ peak temperature. The results of the evaluations are together shown in Tables 8 and 9.

TABLE 8

| | (parts) EXAMPLES | | | | |
|---|---|---|---|---|---|
| | 1b | 2b | 3b | 4b | 5b |
| [Polymer] | | | | | |
| NIPOLE AR 51 | 100 | 100 | 100 | 100 | 100 |
| BAYMAC GLS | — | — | — | — | — |
| [Hindered amine damping property imparting agent] | | | | | |
| ADK STAB T-706 | 50 | — | — | — | — |
| ADK STAB T-707 | — | 50 | — | — | — |
| ADK STAB T-708 | — | — | 50 | — | — |
| ADK STAB T-717 | — | — | — | 50 | — |
| ADK STAB LA-68LD | — | — | — | — | 50 |
| tanδ: right after pressing | 2.00 | 2.09 | 2.54 | 2.59 | 1.92 |
| tanδ: two months later | 2.02 | 2.21 | 2.52 | 2.61 | 1.92 |
| tanδ retention (%) | 101 | 106 | 99 | 101 | 100 |
| peak temperature (° C.) | 25 | 25 | 27 | 29 | 33 |
| Comprehensive evaluation | ○ | ◉ | ◉ | ◉ | ○ |

TABLE 9

| | (parts) EXAMPLES | | | | |
|---|---|---|---|---|---|
| | 6b | 7b | 8b | 9b | 10b |
| [Polymer] | | | | | |
| NIPOLE AR 51 | — | — | — | — | — |
| BAYMAC GLS | 100 | 100 | 100 | 100 | 100 |
| [Hindered amine damping property imparting agent] | | | | | |
| ADK STAB T-706 | 50 | — | — | — | — |
| ADK STAB T-707 | — | 50 | — | — | — |
| ADK STAB T-708 | — | — | 50 | — | — |
| ADK STAB T-717 | — | — | — | 50 | — |
| ADK STAB LA-68LD | — | — | — | — | 50 |

TABLE 9-continued

| | (parts) EXAMPLES | | | | |
|---|---|---|---|---|---|
| | 6b | 7b | 8b | 9b | 10b |
| tanδ: right after pressing | 1.90 | 2.01 | 2.39 | 2.51 | 1.80 |
| tanδ: two months later | 1.86 | 2.03 | 2.36 | 2.48 | 1.81 |
| tanδ retention (%) | 99 | 101 | 99 | 99 | 100 |
| peak temperature (° C.) | 23 | 23 | 24 | 25 | 29 |
| Comprehensive evaluation | ○ | ⊚ | ⊚ | ⊚ | ○ |

As can be understood from the results shown in Tables 8 and 9, the sheets of Examples 1b to 10b had a high tan δ right after pressing. Further, even two months later they kept the tan δ without almost no decline, and their tan δ retention ratios were very high, so that these Examples can exhibit high damping performances for a long period. Further, they had a peak temperature ambient to a room temperature (around 20° C.), and therefore they are suitable for a practical use in a room temperature environment.

THIRD EMBODIMENT

Examples 1c–3c and Comparative Examples 1c–5c

Prior to the preparation of the Examples and Comparative Examples, the following materials were prepared.
[Regulator (C) for a peak temperature of damping, properties]

(Polyamine compound)
① Adduct of xylylenediamine with alkyl glycidyl ether (HARDENER EH-270B available from Asahi Denka Kyogo K.K.) [Amine value: 450]
② Adduct of xylylenediamine with glycidyl ether (HARDENER EH-227 available from Asahi Denka Kyogo K.K.)
[Amine value: 350]

The above polyamine compounds ① and ② have different lengths of an alkyl chain from each other.
(Polyamide amine compound)
③ Polycondensate of a polymerized fatty acid ($C_{36}$), polyethylene polyamine and a fatty acid ($C_1$–$C_{18}$) (HARDENER EH-335 available from Asahi Denka Kyogo K.K.)
[Amine value; 380]
④ Polycondensate of a polymerized fatty acid ($C_{36}$), polyethylene polyamine and a fatty acid ($C_1$–$C_{18}$) (GRANMAID 645 available from Asahi Denka Kyogo K.K.)
[Amine value: 4001]

The above polyamideamine compounds ③ and ④ have different polymerization ratios from each other.

For preparation of the Examples, the materials were blended in accordance with formulations shown in Table 10, and then mixed by means of a twin roll mall at room temperature for about 15 to 20 minutes. The resulting mixtures were each filled into a designated mold and fusion-molded for about 10 minutes by means of a heat pressing machine at 170° C. Then, the mixture was cooling-pressed by applying a face pressure of 130 kgf/cm$^2$ at 0° C. to obtain a sheet with a thickness of 2 mm.

The thus obtained sheets of Examples 1c to 3c and Comparative Examples 1c to 5c were each evaluated with the same manner as Example 1a in respect of a tan δ peak and a tan δ peak temperature. The results of the evaluations are together shown in Table 10.

TABLE 10

| | EXAMPLES | | | COMPARATIVE EXAMPLES | | | | | (parts) |
|---|---|---|---|---|---|---|---|---|---|
| | 1c | 2c | 3c | 1c | 2c | 3c | 4c | 5c | |
| [Polymer] NIPOLE AR 51 | 100 | 100 | 100 | 100 | 100 | 100 | 100 | 100 | |
| [Hindered phenol damping property imparting agent] | | | | | | | | | |
| ADK STAB AO-40 | 40 | — | — | — | — | — | — | — | |
| ADK STAB AO-60 | — | 40 | — | — | — | — | — | — | |
| ADK STAB AO-80 | — | — | 40 | — | — | — | — | — | |
| [Polyamine compound] | | | | | | | | | |
| HARDENER EH-270B | 10 | 10 | 10 | — | 30 | — | — | — | |
| HARDENER EH-227 | — | — | — | — | — | 30 | — | — | |
| [Polyamide amine compound] | | | | | | | | | |
| HARDENER EH-335 | — | — | — | — | — | — | 30 | — | |
| GRANMAID 645 | — | — | — | — | — | — | — | 30 | |
| tan δ:right after pressing | 3.1 | 3.11 | 3.01 | 2.3 | 2.45 | 2.36 | 2.22 | 2.32 | |
| peak temperature (° C.) | 28.5 | 26.3 | 24.8 | 17 | 4 | 5 | 12 | 10 | |
| Comprehensive evaluation | ⊚ | ⊚ | ⊚ | X | X | X | X | X | |

As can be understood from the results shown in Table 10, the sheets of Examples 1c to 3c exhibited an excellent tan δ, which had a tan δ exceeding the prescribed property (tan δ≧2.5). Further, their peak temperatures were lowered while holding a high tan δ, so that they are suitable for use in a room temperature environment.

Conversely, the Comparative Example 1c contained a damping composition comprising acrylic rubber alone, and therefore it had a low tan δ and is regarded as unsuitable for practical use. By the addition of the polyamine compound or the polyamide amine compound, the Comparative Examples 2c to 5c had a lowered peak temperature. However, they exhibited a low tan δ and thus they are not excellent.

Examples 4c–10c

Prior to the preparation of the Examples, the following materials were prepared.
[Damping property imparting agent (D) for shifting the peak temperature of damping properties to lower]
(Acrylic monomer)

① Ethyleneoxide modified bisphenol A diacrylate (ARONIX M-211B available from Toagosei Chemical Industry Co., Ltd.)
② Ehyleneoxide modified isocyanuric acid triacrylate (ARONIX M-315 available from Toagosei Chemical Industry, Co., Ltd.)
③ Ditrymethylolpropane tetra-acrylate (ARONIX M-408 available from Toagosei Chemical Industry Co., Ltd.)
④ Pentaerythrytol tetraacrylate (ARONIX M-450 available from Toagosei Chemical Industry Co., Ltd.)
(Acrylic oligomer)
⑤ Monohydroxyethylacrylate phthalate (ARONIX M-5400 available from Toagosei Chemical Industry Co., Ltd.)
⑥ Polyester acrylate (ARONIX M-8030 available from Toagosei Chemical Industry Co., Ltd.)
⑦ Polyester acrylate (ARONIX M-8060 available from Toagosei Chemical Industry Co., Ltd.), For preparation of the Examples, the materials were blended in accordance with formulations shown in Table 11, and then mixed by means of a twin roll mill at room temperature for about 15 to 20 minutes. The resulting mixtures were each filled into a designated mold and fusion-molded for about 10 minutes by means of a heat pressing machine at 170° C. Then, the mixture was cooling-pressed by applying a face pressure of 130 kgf/cm² at 0° C. to obtain a sheet with a thickness of 2 mm.

The thus obtained sheets of Examples 4c to 10c were each evaluated in the same manner as Example 1a with respect of a tan δ peak value and a tan δ peak temperature. The results of the evaluations are together shown in Table 11.

TABLE 11

| | EXAMPLES (parts) | | | | | | |
|---|---|---|---|---|---|---|---|
| | 4c | 5c | 6c | 7c | 8c | 9c | 10c |
| [Polymer] | | | | | | | |
| NIPOL AR 51 | 100 | 100 | 100 | 100 | 100 | 100 | 100 |
| [Hindered Phenol damping property imparting agent] | | | | | | | |
| ADK STAB AO-80 | 40 | 40 | 40 | 40 | 40 | 40 | 40 |
| [Acrylic monomer] | | | | | | | |
| ARONIX M-211B | 10 | — | — | — | — | — | — |
| ARONIX M-315 | — | 10 | — | — | — | — | — |
| ARONIX M-408 | — | — | 10 | — | — | — | — |
| ARONIX M-450 | — | — | — | 10 | — | — | — |
| [Arcylic oligomer] | | | | | | | |
| ARONIX M-5400 | — | — | — | — | 10 | — | — |
| ARONIX M-8030 | — | — | — | — | — | 10 | — |
| ARONIX M-8060 | — | — | — | — | — | — | 10 |
| tan δ:right after pressing | 3.21 | 3.09 | 3.18 | 3.09 | 3.16 | 3.25 | 3.23 |
| tan δ:one month later | 3.22 | 3.13 | 3.13 | 3.11 | 3.17 | 3.24 | 3.21 |
| tan δ retention (%) | 100 | 101 | 99 | 101 | 100 | 100 | 99 |
| peak temperature (° C.): right after pressing | 28 | 29 | 27 | 27 | 26 | 28 | 29 |
| Comprehensive evaluation | ◎ | ◎ | ◎ | ◎ | ◎ | ◎ | ◎ |

As can be understood from the results shown in Table 11, all the Examples 4c to 10c had a high tan δ right after pressing, which exceeded the prescribed property (tan δ≧2.5). Further, even one month later the tan δ remained almost unchanged, and therefore they had a high tan δ retention ratio. These Examples had a peak temperature of the order of 20° C., which are suitable for use at a temperature of ambient or room temperature.

FOURTH EMBODIMENT

Examples 1d–5d and Comparative Examples 1d and 2d

Prior to the preparation of the Examples and Comparative Examples, the following materials were prepared.
[Acidic organic compound (E)]
Naphthenic acid (SNA 185 available from Sankyo Yuka K.K.) comprising a mixture consisting essentially of a saturated monocyclic carboxylic acid ($C_nH_{2n-1}COOH$), a saturated polycyclic carboxylic acid ($C_nH_{3n-5}COOH$) and an aliphatic carboxylic acid ($C_nH_{2n+1}COOH$)

For preparation of the Examples, the materials were blended in accordance with formulations shown in Table 12, and then mixed by means of a twin roll mill at room temperature for about 15 to 20 minutes. The resulting mixtures were each filled into a designated mold and fusion-molded at 170° C. for about 10 minutes by means of a heat pressing machine. Then, the mixture was cooling-pressed by applying a face pressure of 130 kgf/cm² at 0° C. to obtain a sheet with a thickness of 2 mm.

The thus obtained sheets of Examples 4c to 10c were each evaluated with respect of a tan δ peak value and a tan δ peak temperature. The results of the evaluations are together shown in Table 12. The tan δ was measured by a 2980 type DMA manufactured by TA Instrument Japan Co. under a condition of a strain of 10 μm and a frequency of 100 Hz (constant).

temperature much lower than room temperature, and thus it would be difficult for the composition to exhibit a damping property in a room temperature environment.

FIFTH EMBODIMENT

Examples 1e–14e

Prior to the preparation of the Examples, the following materials were prepared.

[Specific Polymer (A)]
Acrylonitrile-butadiene rubber (NBR) (NIPOL DN005 available from Nippon Zeon Co.)

[Amorphous resin (F)]
① phenol resin (HITANOL 1501 available from Hitachi Kasei Kogyo K.K.)
② dicyclopentadiene (DCPD) resin (QUTNTONE 1500 available from Nippon Zeon Co.)

TABLE 12

| | EXAMPLES | | | | | COMPARATIVE EXAMPLES (parts) | |
|---|---|---|---|---|---|---|---|
| | 1d | 2d | 3d | 4d | 5d | 1d | 2d |
| [Polymer] | | | | | | | |
| NIPOL AR 51 | 100 | 100 | 100 | 100 | — | 100 | — |
| BAYMAC GLS | — | — | — | — | 100 | — | 100 |
| [Hindered phenol damping property imparting agent] | | | | | | | |
| ADK STAB AO-60 | 40 | — | 40 | — | — | — | — |
| ADK STAB AO-80 | — | 40 | — | 40 | 50 | — | — |
| NOCRAC PBK | — | — | — | 10 | — | — | — |
| [Hindered amine damping property imparting agent] | | | | | | | |
| ADK STAB LA-63P | — | — | 5 | — | — | — | — |
| [Acidic organic compound] | | | | | | | |
| SNA 185 | 10 | 10 | 20 | 25 | 10 | — | — |
| tan δ:right after pressing | 2.98 | 2.96 | 3.03 | 2.86 | 2.65 | 3.18 | 2.11 |
| tan δ:two weeks later | 2.80 | 2.98 | 2.90 | 2.90 | 2.64 | 2.64 | 1.73 |
| tan δ retention (%) | 94 | 101 | 96 | 101 | 100 | 83 | 82 |
| peak temperature (° C.): right after pressing | 26.6 | 26.0 | 28.1 | 25 | 21 | 37 | 2 |
| Comprehensive evaluation | ⊚ | ⊚ | ⊚ | ⊚ | ⊚ | X | X |

As can be understood from the results shown in Table 12, the Examples 1d to 5d had an appropriate acidity in the formulation thereof by adding the acidic organic compound (E) thereto. Consequently, they exhibited a tan δ of greater than the prescribed property (tan δ≧2.5), and also had a quite high tan δ retention ratio 2 weeks later. Moreover, they had a peak temperature of ambient or room temperature (around 20° C.), so that they are suitable for use in a room temperature environment.

Conversely, although Comparative Example 1d had a high tan δ immediately after pressing, its tan δ notably declined with time. In addition, it had a peak temperature much higher than room temperature, and thus it would be difficult for the composition to exhibit a damping property in a room temperature environment. Comparative Example 2d had a low tan δ immediately after pressing, and further the tan δ remarkably declined in 2 weeks. It had a peak ③ coumarine resin (EXCRON G90 available from Nippon Steel Chemical)
④ maleic resin (MALKYD 32 available from Arakawa Chemical Industries, Ltd.)
⑤ ketone resin (HIRAC 110H available from Hitachi Chemical Co., Ltd.)

For preparation of the Examples and Comparative Examples, the materials were blended in accordance with formulations shown in Tables 13 and 14, and then mixed by means of a twin roll mill at room temperature for about 15 to 20 minutes. The resulting mixtures were each filled into a designated mold and fusion-molded for about 10 minutes by means of a heat pressing machine at a temperature of not less than 20° C. over a fusion temperature of the blended materials. Then, the mixture was cooling-pressed by applying a face pressure of 130 kgf/cm² at 0° C. to obtain a sheet with a thickness of 2 mm.

The thus obtained sheets of Examples 1e to 14e, were each evaluated with respect of a tan δ peak value and a tan δ peak temperature. The results of the evaluations are shown in Tables 13 and 14. The tan δ was measured by a spectrometer manufactured by Rheology Co. under a condition of a strain of 0.05% (constant) and a frequency of 100 Hz (constant).

TABLE 13

| | EXAMPLES (parts) | | | | | | |
|---|---|---|---|---|---|---|---|
| | 1e | 2e | 3e | 4e | 5e | 6e | 7e |
| [Polymer] | | | | | | | |
| NIPOL AR 51 | 100 | 100 | 100 | 100 | — | 100 | 100 |
| NIPOL DNOO 5 | — | — | — | — | 100 | — | — |
| [Hindered Phenol damping property imparting agent] | | | | | | | |
| ADK STAB AO-40 | 40 | — | — | — | — | — | — |
| ADK STAB AO-60 | — | 40 | — | — | — | — | — |
| ADK STAB AO-80 | — | — | 40 | — | 40 | 40 | 40 |
| [Phosphite ester damping property imparting agent] | | | | | | | |
| ADK STAB PEP-24G | — | — | — | 40 | — | — | — |
| [Phosphate ester damping property imparting agent | | | | | | | |
| TPP | — | — | — | — | — | — | — |
| [Amorphous resin] | | | | | | | |
| HITANOL 1501 | 10 | 10 | 10 | 10 | 10 | 20 | 30 |
| QUINTONE 1500 | — | — | — | — | — | — | — |
| EXCRON G90 | — | — | — | — | — | — | — |
| MALKYD 32 | — | — | — | — | — | — | — |
| HIRAC 110H | — | — | — | — | — | — | — |
| Right after pressing | | | | | | | |
| Temp. range of tan δ>1 (° C.) | 28 | 33 | 32 | 25 | 28 | 32 | 35 |
| tan δ peak value | 3.17 | 2.71 | 2.9 | 2.89 | 2.26 | 3.26 | 3.08 |
| peak temperature (° C.) | 40 | 37 | 32 | 30 | 31 | 40 | 42 |
| One month later | | | | | | | |
| tan δ peak value | 2.89 | 2.66 | 2.88 | 2.21 | 2.11 | 3.25 | 3.07 |
| tan δ retention (%) | 91 | 98 | 99 | 76 | 93 | 100 | 100 |
| Comprehensive evaluation | ◎ | ◎ | ◎ | ○ | 502 | 502 | 502 |

TABLE 14

| | EXAMPLES (parts) | | | | | | |
|---|---|---|---|---|---|---|---|
| | 8e | 9e | 10e | 11e | 12e | 13e | 14e |
| [Polymer] | | | | | | | |
| NIPOL AR 51 | 100 | 100 | 100 | 100 | 100 | 100 | 100 |
| NIPOL DNOO 5 | — | — | — | — | — | — | — |
| [Hindered Phenol damping property imparting agent] | | | | | | | |
| ADK STAB AO-40 | — | — | — | — | — | — | — |
| ADK STAB AO-60 | — | — | — | — | — | — | — |
| ADK STAB AO-80 | 40 | 40 | 40 | 40 | 40 | 40 | 40 |
| [Phosphite ester damping property imparting agent] | | | | | | | |
| ADK STAB PEP-24G | — | — | — | — | — | — | — |
| [Phosphate ester damping property | | | | | | | |

TABLE 14-continued

| | EXAMPLES | | | | | | (parts) |
|---|---|---|---|---|---|---|---|
| | 8e | 9e | 10e | 11e | 12e | 13e | 14e |
| imparting agent] | | | | | | | |
| TPP | — | — | — | — | — | 30 | 30 |
| [Amorphous resin] | | | | | | | |
| HITANOL 1501 | 50 | — | — | — | — | 50 | — |
| QUINTONE 1500 | — | 10 | — | — | — | — | — |
| EXCRON G90 | — | — | 10 | — | — | — | — |
| MALKYD 32 | — | — | — | 10 | — | — | — |
| HIRAC 110H | — | — | — | — | 50 | — | 50 |
| Right after pressing | | | | | | | |
| Temp. range of tan δ>1 (° C.) | 38.5 | 31 | 29 | 32 | 37.7 | 39.6 | 44.6 |
| tan δ peak value | 2.98 | 3.13 | 3.29 | 3.05 | 2.9 | 3.01 | 3.04 |
| peak temperature (° C.) | 38 | 40 | 40 | 38 | 43 | 31 | 33 |
| One month later | | | | | | | |
| tan δ peak value | 2.98 | 2.97 | 3.22 | 2.91 | 2.89 | 2.96 | 2.99 |
| tan δ retention (%) | 100 | 95 | 98 | 95 | 100 | 98 | 98 |
| Comprehensive evaluation | ⊚ | ⊚ | ⊚ | ⊚ | ⊚ | ⊚ | ⊚ |

As can be understood from the results shown in Tables 13 and 14, the sheets of Examples 1e to 14e had a high tan δ right after pressing, and further, even one month later, their tan δ retention ratios were very high. These Examples had a peak temperature at ambient or room temperature, and they had a broader range of temperature to keep a tan δ of greater than 1, so that these Examples can exhibit a relatively high damping property in a wide temperature range centered near room temperature.

Examples 15e and 16e

Prior to the preparation of the Examples, the following materials were prepared.

[Plasticizer (G)]

① Dibutyl phthalate (DBP available from Sanken Kako K.K.)

② Dicyclohexyl phthalate (DCHP available from Osaka Organic Chemical Industry Co., Ltd.)

For preparation of the Examples, the materials were blended in accordance with formulations shown in Table 15, and then mixed by means of a twin roll mill at room temperature for about 15 to 20 minutes. The resulting mixtures were each filled into a designated mold and fusion-molded by means of a heat pressing machine at a temperature of not less than 20° C. over a fusion temperature of the blended components for about 10 minutes. Then, the mixture was cooling-pressed by applying a face pressure of 130 kgf/cm$^2$ at 0° C. to obtain a sheet with a thickness of 2 mm.

The thus obtained sheets of Examples 15e and 16e were each evaluated with respect of a tan δ peak value and a tan δ peak temperature. The results of the evaluations are together shown in Tables 15. The tan δ was measured by a spectrometer manufactured by Rheology Co. under a condition of a strain of 0.05% (constant) and a frequency of 100 Hz (constant).

TABLE 15

| | (part) EXAMPLES | |
|---|---|---|
| | 15e | 16e |
| [Polymer] | | |
| NIPOL AR 51 | 100 | 100 |
| [Hindered phenol damping property imparting agent] | | |
| ADK STAB AO-80 | 40 | 40 |
| [Amorphous resin] | | |
| HITANOL 1501 | 50 | — |
| HIRAC 110H | — | 50 |
| [Plasticizer] | | |
| DBP | 30 | — |
| DCHP | — | 30 |
| Right after pressing | | |
| Temp. range of tanδ > 1 (° C.) | 42.3 | 41.8 |
| tanδ peak value | 3 | 2.99 |
| peak temperature (° C.) | 24 | 26 |
| One month later | | |
| tanδ peak value | 2.88 | 2.96 |
| tanδ retention (%) | 96 | 99 |
| Comprehensive evaluation | ⊚ | ⊚ |

As can be understood from the results shown in Table 15, the sheets of Examples 15e and 16e had a tan δ far exceeding the prescribed property (tan δ ≧ 2.5) right after pressing, and had an excellent value for the tan δ retention ratio. These Examples had a peak temperature of ambient or room temperature, and they had a broader range of temperature maintaining a tan δ of greater than 1, so that these Examples can exhibit a relatively high damping property in a wide temperature range centered near room temperature. Accordingly, the plasticizer blended with the materials of the high damping material composition can not only function as a bulking agent but also broaden the temperature range to exhibit an excellent damping property.

SIXTH EMBODIMENT

Examples 1f–12f

Prior to the preparation of the Examples, the following materials were prepared.

[Specific Polymer (A)]

① Ethylene-acrylic rubber comprising a chemical structural unit derived from a ethylene-methylacrylate copolymer (crosslinking point: ethylene portion) as a main component and a chemical structural unit derived from acrylic acid (crosslinking points carboxyl group) (VAMAC G available from Showa Denko Du Pont)

② Acrylic rubber (Denka ER3400 available from Denki Kagaku K.K.)

[Crosslinking agent (H)]

① Ammonium benzoate represented by the following formula (VULNOC available from Ouchi Shinko Chemical Industrial Co., Ltd.)

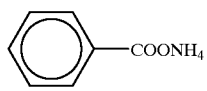

② Zinc dimethyldithiocarbamate represented by the following formula (Nocceler PZ available from Ouchi Shinko Chemical Industrial Co., Ltd.)

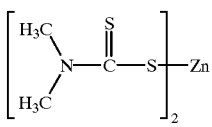

③ Zinc dibutyldithiocarbamate represented by the following formula (Nocceler BZ-G available from Ouchi Shinko Chemical Industrial Co., Ltd;)

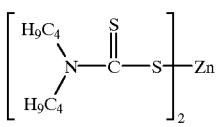

④ Sulfur (SULFUX PMG available from Tsurumi Industries., Ltd.)

⑤ Potassium stearate represented by the formula $CH_3(CH_2)_{16}COOK$ (NONSAL SK-1 available from Nippon Oils and Fats Co., Ltd.)

⑥ 2,4,6-trimercapto-S-triazine represented by the following formula (JISNET F-pt available from Nippon Zeon Co.)

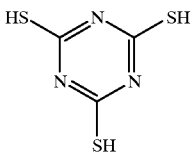

⑦ hexamethylenedianine carbamate represented by the formula $H_3^+N(CH_2)_6NHCO_2^-$ (DIAK #1 available from Showa Denko Du Pont)

⑧ N,N'-di-ortho-tolylguanidine represented by the following formula (Nocceler DT available from Ouchi Shinko Kagaku)

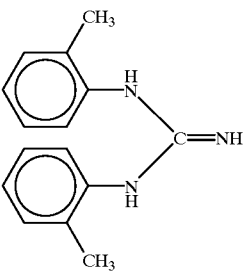

[Crosslinking accelerator]

① Ferric dimethyl dithiocarbamate represented by the following formula (Nocceler TTFE available from Ouchi Shinko Kagaku)

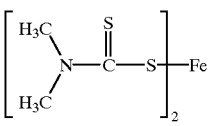

② Beef tallow fatty acid soda soap (NS soap available from Kao Corporation)

③ N,N'-diethylthiourea represented by the following formula (Nocceler EUR available from Ouchi Shinko Kagaku)

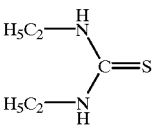

[Process aid]

Stearic acid (LUNAC S30 available from Kao Corporation)

For the preparation of the Examples, the materials were blended in accordance with formulations shown in Tables 16 and 17, and then mixed by means of a twin roll mill at room temperature from about 15 to 20 minutes. The resulting mixtures were each filled into a designated mold and fusion-pressed for about 10 minutes by means of a heat pressing machine at a temperature of not less than 20° C. over a fusion temperature of the damping property imparting agent. Then, the resulting product was cooling-pressed by applying a face pressure of 130 kgf/cm² at 0° C. to obtain a sheet with a thickness of 2 mm.

TABLE 16

| | EXAMPLES | | | | | | (parts) |
|---|---|---|---|---|---|---|---|
| | 1f | 2f | 3f | 4f | 5f | 6f | |
| [Polymer] | | | | | | | |
| NIPOL AR 51 | 100 | 100 | — | — | — | — | |
| NIPOL AR71 | — | — | 100 | 100 | 100 | 100 | |
| VAMAC G | — | — | — | — | — | — | |
| DENKA ER 3400 | — | — | — | — | — | — | |
| [Hindered Phenol damping property imparting agent] | | | | | | | |
| ADK STAB AO-80 | 40 | 40 | 40 | 40 | 40 | 40 | |
| [Crosslinking agent] | | | | | | | |
| VULNOC ABS | 1.5 | — | — | — | — | — | |
| NOCCELLER PZ | — | 2.5 | — | — | — | — | |
| NOCCELLER BZ-G | — | — | — | 1.5 | 1.5 | 1.5 | |
| SULFUX PMG | — | — | 0.3 | — | — | — | |
| NONSAL SK-1 | — | — | 0.5 | — | — | — | |
| JISNET F-pt | — | — | — | 0.58 | 0.58 | 0.58 | |
| DIAK #1 | — | — | — | — | — | — | |
| NOCCELLER DT | — | — | — | — | — | — | |
| [Crosslinking accelerator] | | | | | | | |
| NOCCELLER TTFE | — | 0.5 | — | — | — | — | |
| NS SOAP | — | — | 3 | — | — | — | |
| NOCCELLER EUR | — | — | — | 0.3 | 0.3 | 0.3 | |
| [Process aid] | | | | | | | |
| LUNAC S30 | 1.5 | 1.5 | 1.5 | 1.5 | 1.5 | 1.5 | |

TABLE 17

| | EXAMPLES | | | | | | (parts) |
|---|---|---|---|---|---|---|---|
| | 7f | 8f | 9f | 10f | 11f | 12f | |
| [Polymer] | | | | | | | |
| NIPOL AR 51 | — | — | — | — | 100 | 100 | |
| NIPOL AR71 | 100 | 100 | — | — | — | — | |
| VAMAC G | — | — | 100 | — | — | — | |
| DENKA ER 3400 | — | — | — | 100 | — | — | |
| [Hindered Phenol damping property imparting agent] | | | | | | | |
| ADK STAB AO-80 | 50 | 150 | 40 | 40 | 40 | 40 | |
| [Crosslinking agent] | | | | | | | |
| VULNOC ABS | — | — | — | — | 0.5 | 0.2 | |
| NOCCELLER PZ | — | — | — | — | — | — | |
| NOCCELLER BZ-G | 1.5 | 1.5 | — | — | — | — | |
| SULFUX PMG | — | — | — | — | — | — | |
| NONSAL SK-1 | — | — | — | — | — | — | |
| JISNET F-pt | 0.58 | 0.58 | — | — | — | — | |
| DIAK #1 | — | — | 2 | — | — | — | |
| NOCCELL DT | — | — | — | 5 | — | — | |
| [Crosslinking accelerator] | | | | | | | |
| NOCCELLE TTFE | — | — | — | — | — | — | |
| NS SOAP | — | — | — | — | — | — | |
| NOCCELLER EUR | 0.3 | 0.3 | — | — | — | — | |
| [Process aid] | | | | | | | |
| LUNAC S30 | 1.5 | 1.5 | 1.5 | 1.5 | 1.5 | 1.5 | |

The thus obtained sheets of Examples 1f to 12f were each evaluated in respect of specific gravity, hardness, tensile strength, extension, tear strength, permanent compression set, impact resilience and tan δ. The tan δ was measured by a dynamic viscoelasticity measurement apparatus (DMA manufactured by TA Instrument Co.) under a condition of a frequency of 10 Hz. and a strain of 10 μm. The other properties were measured according to JIS K 6301. The results of the evaluations are shown in Tables 18 and 19.

TABLE 18

| | EXAMPLES | | | | | |
|---|---|---|---|---|---|---|
| | 1f | 2f | 3f | 4f | 5f | 6f |
| Specific gravity | 1.12 | 1.13 | 1.12 | 1.13 | 1.12 | 1.13 |
| Hardness (shore A) | 48.5 | 50.3 | 41.2 | 42.2 | 45.6 | 43.3 |
| Tensile strength (kgf/cm$^2$) | 17.5 | 17.5 | 26 | 21.6 | 26.3 | 22.3 |
| Extension (%) | 723 | 716 | 448 | 368 | 328 | 359 |
| Tear strength (kgf/cm) | 5.19 | 5.28 | 5.73 | 5.35 | 8.21 | 6.1 |
| [Permanent compression set] | | | | | | |
| 70° C. × 22 h (%) | 26 | 17 | 2 | 1.8 | 0 | 1.3 |
| 100° C. × 22 h (%) | 35 | 31.2 | 30.5 | 2.4 | 0.5 | 1.9 |
| Impact resilience (%) | 0.5 | 0.5 | 0.7 | 0.7 | 8 | 0.5 |
| tan δ peak value | 3.15 | 3.1 | 2.96 | 3 | 1.98 | 2.48 |
| Peak Temperature (° C.) | 26 | 26 | 21 | 23 | 12 | 18 |
| tan δ (20° C.) | 2.55 | 2.43 | 2.85 | 2.72 | 0.93 | 2.3 |

TABLE 19

| | EXAMPLES | | | | | |
|---|---|---|---|---|---|---|
| | 7f | 8f | 9f | 10f | 11f | 12f |
| Specific gravity | 1.13 | 1.14 | 1.15 | 1.13 | 1.15 | 1.13 |
| Hardness (shore A) | 48.2 | 54.5 | 50.3 | 47.8 | 48 | 58 |
| Tensile strength (kgf/cm$^2$) | 23.4 | 28.9 | 21.2 | 17 | 17.2 | 30.5 |
| Extension (%) | 428 | 440 | 318 | 735 | 980 | 269 |
| Tear strength (kgf/cm) | 5.68 | 5.29 | 8.56 | 5.12 | 5.2 | 13.2 |
| [Permanent compression set] | | | | | | |
| 70° C. × 22 h (%) | 2.8 | 35.1 | 29 | 12 | 48 | 0.5 |
| 100° C. × 22 h (%) | 5.1 | 57.3 | 35 | 18 | 53 | 0.5 |
| Impact resilience (%) | 0.5 | 0.6 | 0.5 | 1 | 0.5 | 9 |
| tan δ peak value | 3.1 | 4.31 | 2.36 | 2.96 | 2.9 | 2.05 |
| Peak Temperature (° C.) | 25 | 38 | 22 | 17 | 32 | 33 |
| tan δ (20° C.) | 2.42 | 1.54 | 2.12 | 2.69 | 0.8 | 0.6 |

As can be understood from the results shown in Tables 18 and 19, the Examples each had a remarkably improved permanent compression set and a low impact resilience, resulting in the Examples exhibiting a high damping property.

SEVENTH EMBODIMENT

Examples 1g–18g

Prior to the preparation of the Examples, the following materials were prepared.

① Dinitrosopentamethylenetetramine (DPT) represented by the above formula (a) (CELLMIC A available from Sankyo Kasei, decomposition temp. 205° C.)

② Azodicarbonamide (ADCA) represented by the above formula (b) (CELLMIC C-22 available from Sankyo Kasei, decomposition temp. 207° C.)

③ p,p'-oxybis benzene sulfonyl hydrazide (OBSH) represented by the above formula (c) (CELLMIC H available from Sankyo Kasei, decomposition temp. 155° C.)

④ p-toluenesulfonyl hydrazide (TSH) represented by the above formula (d) (CELLMIC H available from Sankyo Kasei, decomposition temp. 110° C.)

⑤ p-toluenesulfonyl acetonehydrazone represented by the above formula (e) (TSH-derivative) (CELLMIC K available from Sankyo Kassi, decomposition temp. 125° C.)

⑥ hydrazodicarbonamide represented by the above formula (f) (HDCA) (CELLMIC 142 available from Sankyo Kasei, decomposition temp. 245° C.)

[Foaming aid]

urea foaming aid (CELLTON NP available from Sankyo Kasei)

[Foaming agent+foaming aid]

DPT+urea foaming aid [DPT:aid=1:1] (CELLMIC ANP available from Sankyo Kasei, decomposition temp. 120° C.)

[Carbon Black]

Seast 5 available from Tokai Carbon Co.

[Calcium carbonate]

WHITONE SB available from Bihoku Funka Kogyo K.K.

[Plasticizer]

① POLICIZER W320 available from Dainippon Ink & Chemicals Inc.

② ADK CIZER PN150 available from Asahi Denka Kogyo K.K.

[Phenol resin]

HITANOL 1501 available from Hitachi Chemical Co., Ltd.

[Anti-oxidant]

NAUGARD 445 available from Shiraishi Calcium Co., Ltd.

[Process aid]

① Fatty amid (DIAMIDE B45 available from Nippon Kasei Chemical Co., Ltd.)

② Stearic acid (LUNAC S30 available from Kao Corporation)

For preparation of the Examples, the materials were blended in accordance with formulations shown in Tables 20 to 22, and then mixed by means of a twin roll mill at room temperature for about 15 to 20 minutes. The resulting mixtures were each filled into a designated mold and molded by way of press-foam molding at 160° C. for about 20 minutes by means of a heat pressing machine to obtain a sheet with a thickness of 2 mm.

TABLE 20

| | (parts) EXAMPLES | | | | | |
|---|---|---|---|---|---|---|
| | 1g | 2g | 3g | 4g | 5g | 6g |
| [Polymer] | | | | | | |
| NIPOL AR 51 | 100 | — | — | 100 | 100 | 100 |
| NIPOL AR71 | — | 100 | 100 | — | — | — |
| [Hindered Phenol damping property imparting agent] | | | | | | |
| ADK STAB AO-80 | 40 | 40 | 40 | 10 | 30 | 50 |
| [Crosslinking agent] | | | | | | |
| VULNOC ABS | 1.5 | — | — | 1.5 | 1.5 | 1.5 |
| NOCCELLER BZ-G | — | 1.5 | 1.5 | — | — | — |
| JISNET F-pt | — | 0.5 | 0.5 | — | — | — |
| [Crosslinking accelerator] | | | | | | |
| NOCCELLER EUR | — | 0.3 | 0.3 | — | — | — |
| [Foaming agent] | | | | | | |
| CELLMIC A | — | — | — | — | — | — |
| CELLMIC C-22 | — | — | — | — | — | — |
| CELLMIC S | — | — | — | — | — | — |
| CELLMIC H | — | — | — | — | — | — |
| CELLMIC K | — | — | — | — | — | — |
| CELLMIC 142 | — | — | — | — | — | — |
| [Foaming aid] | | | | | | |
| CELLTON NP | — | — | — | — | — | — |
| [Foaming agent + Foaming aid] | | | | | | |
| CELLTON ANP | 19 | 19 | 14 | 19 | 19 | 19 |
| SEAST S | 20 | 20 | — | 20 | 20 | 20 |
| WHITONE SB | — | — | 50 | — | — | — |
| POLICIZER W320 | — | — | — | 10 | 10 | 10 |
| ADK CIZER PN150 | — | 10 | — | — | — | — |
| HITANOL 1501 | 20 | — | 10 | — | — | — |
| NAUGARD 445 | — | — | — | 1 | 1 | 1 |
| DIAMIDE B45 | — | 4 | 4 | — | — | — |
| LUNAC S30 | 1 | 1 | 1 | 1 | 1 | 1 |
| Decomposition temperature (° C.) | 120 | 120 | 120 | 120 | 120 | 120 |

TABLE 21

| | (parts) EXAMPLES | | | | | |
|---|---|---|---|---|---|---|
| | 7g | 8g | 9g | 10g | 11g | 12g |
| [Polymer] | | | | | | |
| NIPOL AR 51 | 100 | 100 | 100 | 100 | 100 | 100 |
| NIPOL AR71 | — | — | — | — | — | — |
| [Hindered Phenol damping property imparting agent] | | | | | | |
| ADK STAB AO-80 | 150 | 40 | 40 | 40 | 40 | 40 |
| [Crosslinking agent] | | | | | | |
| VULNOC ABS | 1.5 | 1.5 | 1.5 | 1.5 | 1.5 | 1.5 |
| NOCCELLER BZ-G | — | — | — | — | — | — |
| JISNET F-pt | — | — | — | — | — | — |
| [Crosslinking accelerator] | | | | | | |
| NOCCELLER EUR | — | — | — | — | — | — |
| [Foaming agent] | | | | | | |
| CELLMIC A | — | — | — | — | — | — |
| CELLMIC C-22 | — | 10 | — | — | — | — |
| CELLMIC S | — | — | — | — | — | — |
| CELLMIC H | — | — | — | — | — | — |
| CELLMIC K | — | — | — | — | — | — |
| CELLMIC 142 | — | — | — | — | — | — |
| [Foaming aid] | | | | | | |
| CELLTON NP | — | 10 | — | — | — | — |
| [Foaming agent + Foaming aid] | | | | | | |
| CELLTON ANP | 19 | — | 35 | 14 | 6 | 5 |
| SEAST S | 20 | 20 | 20 | 20 | 20 | 20 |
| WHITONE SB | — | — | — | — | — | — |
| POLICIZER W320 | 10 | 10 | — | — | — | — |
| ADK CIZER PN150 | — | — | 10 | 10 | 10 | 10 |
| HITANOL 1501 | — | — | — | — | — | — |
| NAUGARD 445 | 1 | — | — | — | — | — |
| DIAMIDE B45 | — | — | 4 | 4 | 4 | 4 |
| LUNAC S30 | 1 | 1 | 1 | 1 | 1 | 1 |
| Decomposition temperature (° C.) | 120 | 125 | 120 | 120 | 120 | 120 |

TABLE 22

| | (parts) EXAMPLES | | | | | |
|---|---|---|---|---|---|---|
| | 13g | 14g | 15g | 16g | 17g | 18g |
| [Polymer] | | | | | | |
| NIPOL AR 51 | 100 | 100 | 100 | 100 | 100 | 100 |
| NIPOL AR71 | — | — | — | — | — | — |
| [Hindered Phenol damping property imparting agent] | | | | | | |
| ADK STAB AO-80 | 40 | 150 | 40 | 40 | 40 | 40 |
| [Crosslinking agent] | | | | | | |
| VULNOC ABS | 1.5 | 1.5 | 1.5 | 1.5 | 1.5 | 1.5 |
| NOCCELLER BZ-G | — | — | — | — | — | — |
| JISNETF-pt | — | — | — | — | — | — |
| [Crosslinking accelerator] | | | | | | |
| NOCCELLER EUR | — | — | — | — | — | — |
| [Foaming agent] | | | | | | |
| CELLMIC A | — | 20 | — | — | — | — |
| CELLMIC C-22 | — | — | — | — | — | — |
| CELLMIC S | — | — | 19 | — | — | — |
| CELLMIC H | — | — | — | 10 | — | — |
| CELLMIC K | — | — | — | — | 19 | — |
| CELLMIC 142 | — | — | — | — | — | 10 |
| [Foaming aid] | | | | | | |
| CELLTON NP | — | 20 | — | 10 | — | 10 |
| [Foaming agent + Foaming aid] | | | | | | |
| CELLTON ANP | 40 | — | — | — | — | — |
| SEAST S | 20 | 20 | 20 | 20 | 20 | 20 |
| WHITONE SB | — | — | — | — | — | — |
| POLICIZER W320 | — | — | — | — | — | — |
| ADK CIZER PN150 | 10 | 10 | 10 | 10 | 10 | 10 |

TABLE 22-continued

| | (parts) EXAMPLES | | | | | |
|---|---|---|---|---|---|---|
| | 13g | 14g | 15g | 16g | 17g | 18g |
| HITANOL 1501 | — | — | — | — | — | — |
| NAUGARD 445 | — | — | — | — | — | — |
| DIAMIDE B45 | 4 | 4 | 4 | 4 | 4 | 4 |
| LUNAC S30 | 1 | 1 | 1 | 1 | 1 | 1 |
| Decomposition temperature (° C.) | 120 | 125 | 155 | 105 | 125 | 160 |

The thus obtained sheets of Examples 1g to 18g were each evaluated in respect of specific gravity, impact resilience, hardness and tan δ. The tan δ was measured by means of a dynamic viscoelasticity measurement apparatus (DMA) manufactured by TA Instrument Co. under a condition of a frequency of 10 Hz and a strain of 10 μm. The other properties were measured according to JIS K 6301. Further, the damping ratio of the composition of Examples 1g to 18g were each measured by the following method. The results of the evaluations are shown in Tables 23, 24 and 25.

[Damping Ratio]

Figure 5:
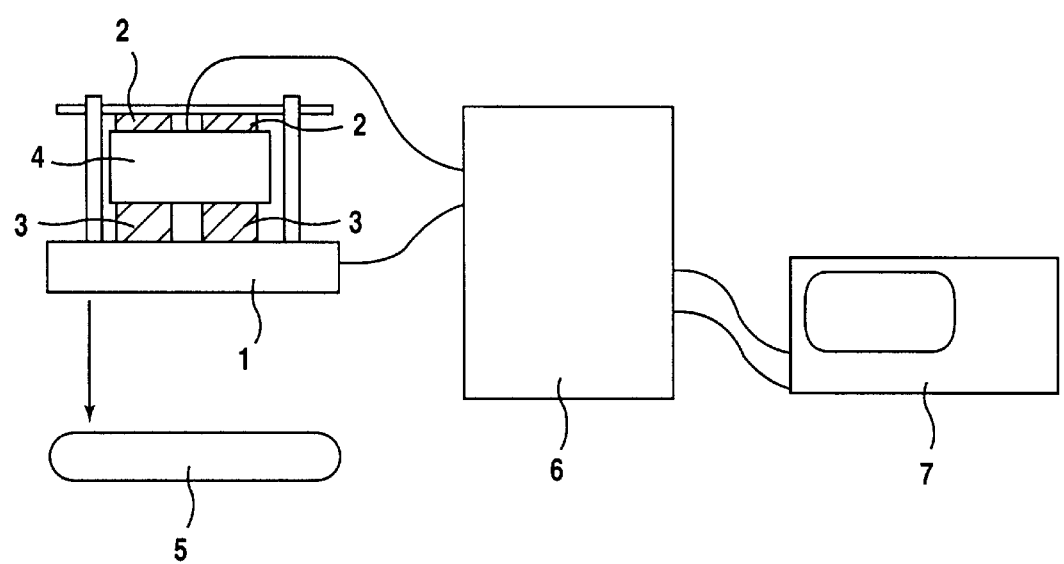
FIG. 5 is a schematic view for explaining a method of measuring a damping ratio.

Damping materials with a thickness of 10 mm and a surface area of 2 cm², 3 cm², 4 cm², 8 cm² and 12 cm² respectively were formed of the composition of the Examples. As shown in FIG. 5, a sample 4 was sandwiched and fixed on a sample board between an upper damping material 2 (with a surface area of 8 cm²) and a lower damping material 3 (with a surface area of 2 cm²). Then, the sample 4 was caused to fall with the entire Sample board 1 from a height of 30 cm onto a mount 5, an impact acceleration G given to the sample board 1 (maximum input acceleration G) and an impact acceleration G given to the sample 4 (maximum output acceleration G) were each measured and a damping ratio was calculated in accordance with the following formula. In FIG. 5, there are shown a control unit 6 (an amplifier) and a Fourier transform analyzer 7 (FFT). The lower damping material 3 was changed from one with a surface area of 2 cm² to those with a surface area of 3 cm², 4 cm², 8 cm² and 12 cm² respectively, and the damping ratio was obtained in the same manner as described above. The measurement conditions are described below and the evaluation test was basically conducted in compliance with JIS C0041.

$$\text{Damping ratio}(\%) = \frac{\text{maximum input acceleration } G - \text{maximum output acceleration } G}{\text{maximum input acceleration } G} \times 100$$

<measurement conditions>

Sample: A mass of PP(polypropylene)

Sample weight: 215 g (equivalent to the weight of a hard disc of an ordinary personal computer)

Impact-applied area of the sample (bottom area of sample): 40 cm² (10×4 cm)

Mount to be used in the impact test: 2 ms (half-sine wave)

Drop height: 30 cm (equivalent to free drop with a height of 75 cm)

Input impact acceleration: maximum 400G,

Mount and control unit (amplifier,): SQ-700 available from Yoshida Seiki Co., Ltd.

FFT: analyzing recorder 3655E 14 available from Yokogawa Electric Corporation

TABLE 23

| | | EXAMPLES | | | | | |
|---|---|---|---|---|---|---|---|
| | | 1g | 2g | 3g | 4g | 5g | 6g |
| Specific gravity before foaming (X) | | 0.99 | 0.97 | 1.06 | 1.01 | 1.02 | 1.04 |
| Specific gravity after foaming (Y) | | 0.099 | 0.18 | 0.2 | 0.098 | 0.099 | 0.096 |
| Foaming magnification (X/Y) | | 10 | 5.4 | 5.29 | 10.3 | 10.3 | 10.8 |
| Impact resilience (%) | | 11 | 31 | 22 | 23 | 16 | 14 |
| Hardness (Asker C) | | 5 | 9.5 | 9.5 | 68 | 13 | 9.5 |
| tan δ peak value | | 1.63 | 1.76 | 1.58 | 1.08 | 1.57 | 1.99 |
| Peak temperature (° C.) | | 26.9 | 26.7 | 28.8 | 12 | 18 | 25 |
| Damping ratio (%) | | | | | | | |
| Bottom area of lower damping material | 2 cm² | — | 15.3 | 23.9 | — | — | — |
| | 3 cm² | — | 57.5 | 23.8 | — | — | — |
| | 4 cm² | 65.7 | 43.6 | 41.4 | 36 | 50.5 | 44.6 |
| | 8 cm² | 49.1 | — | — | 35.6 | 46.4 | 48.3 |
| | 12 cm² | 43.4 | — | — | 23.6 | 40.8 | 42 |

TABLE 24

| | EXAMPLES | | | | | |
|---|---|---|---|---|---|---|
| | 7g | 8g | 9g | 10g | 11g | 12g |
| Specific gravity before foaming (X) | 1.04 | 0.99 | 1.05 | 1.00 | 1.02 | 1.02 |
| Specific gravity after foaming (Y) | 0.15 | 0.21 | 0.075 | 0.26 | 0.81 | 0.85 |

TABLE 24-continued

| | EXAMPLES | | | | | |
|---|---|---|---|---|---|---|
| | 7g | 8g | 9g | 10g | 11g | 12g |
| Foaming magnification (X/Y) | 6.9 | 4.7 | 3.85 | 3.85 | 1.26 | 1.2 |
| Impact resilience (%) | 8 | 8 | 10 | 28 | 36 | 37 |
| Hardness (Asker C) | 12 | 13 | 1.5 | 8.5 | 25 | 28 |
| tan δ peak value | 2.33 | 1.74 | 1.73 | 1.85 | 2.35 | 2.31 |
| Peak temperature (° C.) | 38 | 26.5 | 26 | 26.5 | 27 | 27 |
| Damping ratio (%) | | | | | | |
| Bottom area of lower damping material  2 cm² | — | — | — | 40.3 | 30.1 | 30.0 |
| 3 cm² | 33.4 | 56.3 | — | 55.4 | 27.8 | 19.9 |
| 4 cm² | 24.3 | 52.4 | 23.7 | 32.8 | 18.8 | 12.3 |
| 8 cm² | 20.7 | 44 | 39.4 | — | — | — |
| 12 cm² | — | — | 44.9 | — | — | — |

TABLE 25

| | EXAMPLES | | | | | |
|---|---|---|---|---|---|---|
| | 13g | 14g | 15g | 16g | 17g | 18g |
| Specific gravity before foaming (X) | 1.11 | 1.18 | 1.10 | 1.11 | 1.12 | 1.12 |
| Specific gravity after foaming (Y) | 0.03 | 0.05 | 0.12 | 0.35 | 0.13 | 0.41 |
| Foaming magnification (X/Y) | 37 | 24 | 9.2 | 3.2 | 8.6 | 2.7 |
| Impact resilience (%) | 0 | 0 | 15 | 32 | 16 | 38 |
| Hardness (Asker C) | 0 | 10 | 6 | 21 | 9 | 36 |
| tan δ peak value | 1.71 | 2.21 | 1.77 | 1.81 | 1.69 | 1.95 |
| Peak temperature (° C.) | 26.3 | 45.5 | 28 | 27 | 26.8 | 29.6 |
| Damping ratio (%) | | | | | | |
| Bottom area of lower damping material  2 cm² | — | — | — | 21.2 | — | 23.5 |
| 3 cm² | — | 18.2 | 48.1 | 16.5 | 43.0 | 21.0 |
| 4 cm² | 2.3 | 17.5 | 46.5 | 11.1 | 45.1 | 19.9 |
| 8 cm² | 19.8 | 36 | 47.3 | — | 47.0 | — |
| 12 cm² | 35.9 | — | — | — | — | — |

As can be understood from the results shown in Tables 23, 24 and 25, the Examples exhibited a low impact resilience and a high damping property, and have a high damping ratio. Thus, they had an excellent impact absorbing property against a light load.

EIGHTH EMBODIMENT

Examples 1h and 3h

Prior to the preparation of the Examples, the following materials were prepared.
[Specific Polymer (A)]
Ethylene-methacrylate copolymer (VAMAC DLS available from Du Pont)
[Damping property imparting material (B) comprising a nitrogen-containing basic compound]
Isocyanate fire retardant, tris(2,3-dibromopropyl isocyanurate represented by the previously-described formula (TAIC-6B available from Nippon Kasei Chemical Co., Ltd.)
[Damping property imparting material (B) comprising a phosphite ester compound]
Bis(2,4-di-t-butylphenyl)pentaerythritol diphosphite represented by the previously-described formula (ADK STAB PEP-24G available from Asahi Denka Kogyo K.K.)

For the preparation of the Examples, the materials were blended in accordance with formulations shown in Table 26, and then mixed by means of a twin roll mill at room temperature for about 15 to 20 minutes. The resulting mixtures were each filled into a designated mold and fusion-molded for about 10 minutes by means of a heat pressing machine at a temperature of not less than 20° C. over a fusion temperature of the damping property imparting agent. Then, the resulting product was cooling-pressed by applying a face pressure of 130 kgf/cm² at 0° C. to obtain a sheet with a thickness of 2 mm.

Then, a crystallization inhibition layer was formed on the surface of the sheet by using two-part silane coupling agents of the dehydrogenating condensation type. First, three silane coupling agents containing SiOH and SiH in the molecule thereof (X-32-1291A, S-32-1291B, X-32-1201C available from Shin-Etsu Chemical Co., Ltd.) and a platinum catalyst (CAT-PS-1 available from Shin-Etsu Chemical Co., Ltd.) were prepared, and then these were mixed in a ratio of 70:30:15:2. The resulting mixture was uniformly applied on the surface of the sheet by a brush, and then the sheet was heated at 100° C. for 10 minutes so that a coupling reaction described by the following reaction formula took place on the surface thereof for curing the material surface. Consequently, the crystallization inhibition layer with a thickness of 1 μm was formed on the sheet surface.

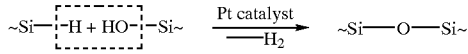

Examples 2h–4h

In accordance with formulations shown in Table 26, materials were blended and processed in the same manner as Example 1h for obtaining a sheet with a thickness of 2 mm.

-continued $$\sim Si\text{---}O\text{---}Si\sim \quad + \quad CH_3COOH$$

The thus obtained sheets of Examples 1h through 4h were evaluated with respect of a tan δ peak value and a tan δ peak temperature. The results of the evaluations are together shown in Tables 26. The tan δ was measured by a spectrometer manufactured by Rheology Co. under a condition of a strain of 0.05% (constant) and a frequency of 100 Hz (constant).

TABLE 26

| | | EXAMPLES | | | (parts) |
|---|---|---|---|---|---|
| | | 1h | 2h | 3h | 4h |
| [Polymer] | | | | | |
| NIPOL AR 51 | | 100 | 100 | — | — |
| VAMAC DLS | | — | — | 100 | 100 |
| [Damping property imparting agent (basic compound containing nitrogen)] | | | | | |
| TAIC-6B | | 50 | 50 | — | — |
| [Phosphite ester damping property imparting agent] | | | | | |
| ADK STAB PEP-24G | | — | — | 50 | 50 |
| tan δ peak value: right after pressing | | 2.6 | 1.46 | 2.4 | 1.3 |
| tan δ peak value: two months later | | 2.65 | 1.39 | 2.25 | 1.3 |
| tan δ retention (%) | | 102 | 95 | 94 | 100 |
| Surface condition of material | | transparent | transparent | transparent | transparent |
| Comprehensive evaluation | | ⊚ | ○ | ⊚ | ○ |

Then, a crystallization inhibition layer was formed on the surface of the sheet by using a one-part silane coupling agent of the acetic acid elimination reaction type. First, the surface of the sheet was cleaned with toluene, and a substrate treatment agent (PRIMER G available from Shin-Etsu Chemical Co., Ltd.) was uniformly applied on the surface by a brush, and the treated sheet was air-dried for 30 minutes. Subsequently, a silane coupling agent comprising polysiloxane containing —OCO—CH$_3$ in the molecule thereof (KE-42-TS available from Shin-Etsu Chemical Co., Ltd.) was uniformly applied by a brush, and a crystallization inhibition layer with a thickness of 1 μm was formed on the sheet surface by a coupling reaction represented the following reaction formula.

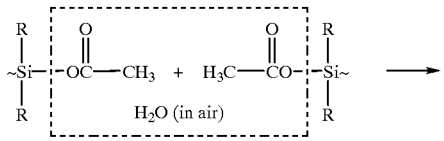

As can be understood from the results shown in Table 26, the sheets of Examples 1h and 3h exhibited a high tan δ and a high tan δ retention ratio. The sheets of Examples 2h and 4h exhibited a little lower tan δ immediately after pressing, however they had almost no decline of tan δ 2 months later. Further, the Examples 1h to 4h did not cause any crystallization and bleeding, and therefore they each maintained transparency in the surface condition thereof since right after pressing.

Figure 4:
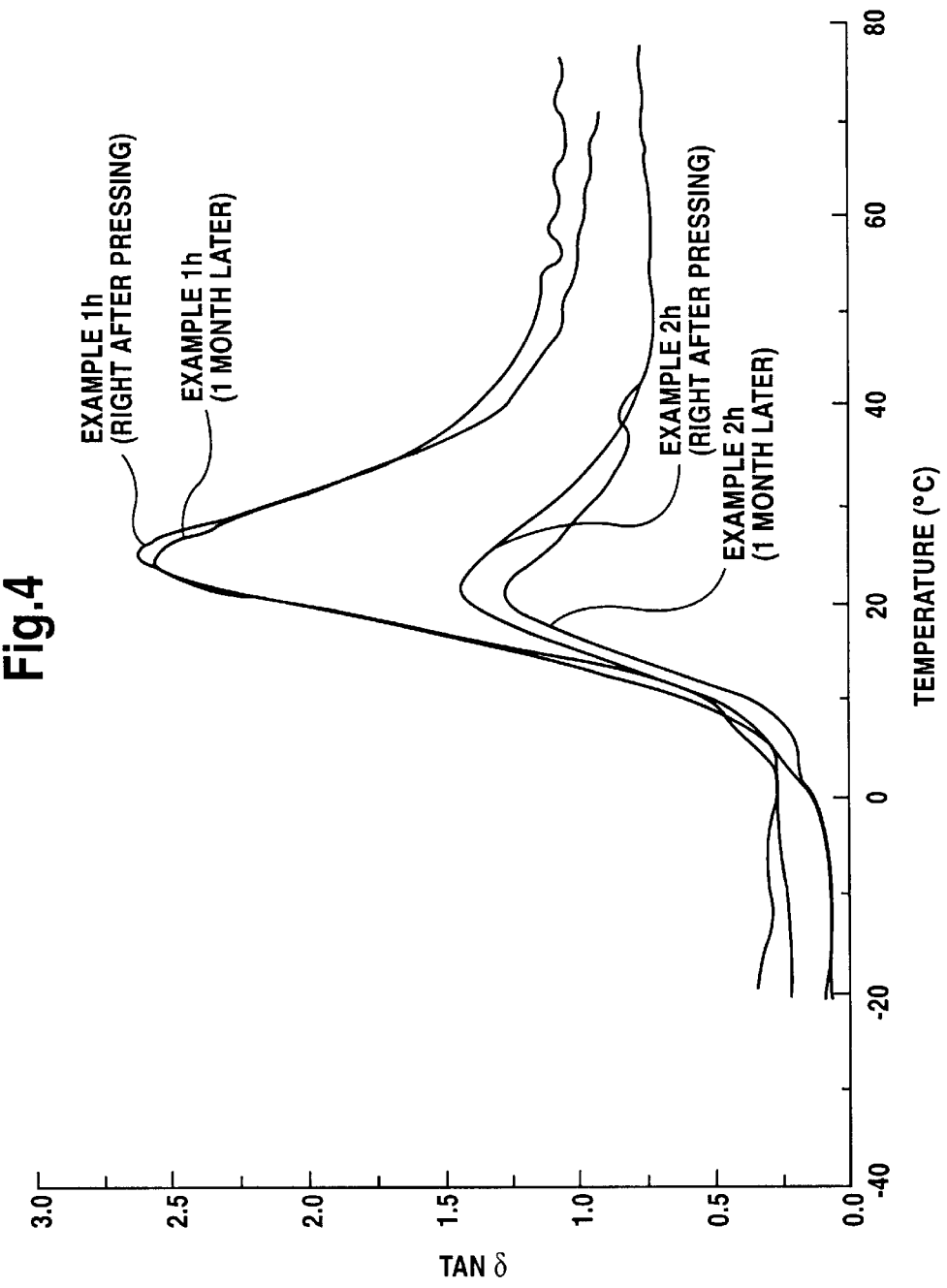
FIG. 4 is a graph showing temperature changes of tan δ of Examples 1h and 2h.

FIG. 4 shows temperature changes of tan δ of Examples 1h and 2h. As evident from FIG. 4, Example 1h did not have any decline of a damping property even 1 month later, and exhibited an excellent performance. On the other hand, Example 2h exhibited a lower tan δ, yet had a small decline of tan δ with time, and thus is considered excellent. Examples 1h and 2h have a peak temperature of ambient or room temperature (around 20° C.), so that they can exhibit their damping properties at approximately room temperature at which the compositions are most frequently used.

EFFECTS OF THE INVENTION

As described hereinbefore, the high damping material composition of the present invention contains the specific polymer (A) and the specific damping property imparting agent (B). The combined use of the components (A) and (B) makes an interaction therebetween homogeneous and appropriate, so that the component (B) is homogeneously dispersed in the component (A), resulting in exhibition of a high tan δ. Moreover, the homogeneous dispersion can be maintained for a long period thereby to prevent a decline of tan δ with time. The composition of the present invention has a tan δ peak temperature of approximately room temperature, which makes the compositions suitable for use in a room temperature atmosphere.

The use of the regulator (C) for a peak temperature for a damping property together with the components (A) and (B) makes it possible to design a material to have a peak temperature in the range of temperatures suitable for the intended use. Moreover, it is possible to cause no bleeding and to inhibit a decline of tan δ with time.

Where a specific damping property imparting agent (D) for shifting the peak temperature for damping properties to a lower temperature is used in combination, it is possible to design the material composition to have a peak temperature in the range temperatures suitable for the intended use while holding a high tan δ.

Further, an acidic organic compound (E) may be used in combination to provide an appropriate acidity of formulation ingredients and to inhibit a decline of tan δ with time. The acidic organic compound (E) is available at a relatively low price, and thus when the component (E) is mixed, the formulation amount of component (B) can be reduced so that the production cost is lowered.

Furthermore, the combined use of a specific amorphous resin (F) does not cause deposition or crystallization of the component (B) so that the component (B) disperses in the component (A) for a long time. Thus, an excellent damping capacity can be permanently maintained.

Moreover, the combined use of a specific plasticizer (G) can reduce the formulation amount of the component (B) to make raw materials cheaper.

Still further, the combined use of a specific crosslinking agent (H) and a crosslinking accelerator can make a hydrogen bond (pseudo crosslinking) of the polar side chain of the component (A) to the component (B), resulting in a high damping property. In addition, crosslinking is formed in a side chain by way of a covalent bond, and therefore the permanent compression set property is remarkably improved.

Further, when a specific foaming agent (I) is used in combination, the foaming agent (I) is thermally decomposed at a decomposition temperature (gas-generation temperature) to generate a gas and to form a cell structure in the component (A), resulting in an improved impact absorbing performance against a light load. The resultant material composition has a lower specific gravity due to the cell structure, and thus the costs for materials can be reduced.

The excellent high damping material, composition of the present invention has a wide range of applications and is useful as a vibration damper material and an acoustic insulating material such as a sound insulating wall for an acoustic room, a sound insulating partition for a construction structure and a soundproofing wall for a vehicle. Further, the high damping material composition is adapted for various types of use, for example, as a base isolation material; a shoe sole; vibration damper materials for the grip portions of implements, such as tennis rackets, table tennis rackets, baseball bats, golf clubs and hockey sticks; vibration damper materials for compact disk reading portions of electric appliances or the like; cushion materials, for example, a PC cushioning protector against inadvertent dropping; and vibration damper materials for tap hammering.

What is claimed is:

1. A high damping material composition comprising the following components (A) and (B):
   (A) a polymer having in the molecular chain thereof a chemical structural unit derived from;
   at least one selected from the group consisting of an ethylene-acrylic copolymer represented by the following general formula (3), an ethylene-methacrylic copolymer represented by the following general formula (4) and vinyl acetate represented by the following general formula (5),

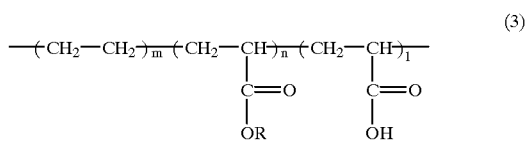

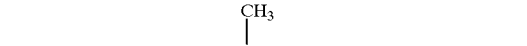

wherein R is a group selected from the group consisting of a methyl group, an ethyl group, a propyl group, a butyl group, a methoxyethyl group and an ethoxyethyl group; n, m and l are natural numbers; and
   (B) at least one damping property imparting agent selected from the group consisting of a hindered phenol compound, a phosphite ester compound, a phosphate ester compound, a basic compound containing nitrogen and a hindered amine compound having a molecular weight of 500 to 2000.

2. The high damping material composition according to claim 1, wherein the component (B), the damping property imparting agent is present in a proportion of 10 to 300 parts by weight, based on 100 parts of the component (A).

3. The high damping material composition according to claim 1, wherein the damping property imparting agent includes at least one phosphite ester compound selected from the group consisting of di(nonylphenyl)pentaerythritol diphosphite, bis(2,4-di-t-butylphenyl)pentaerythritol diphosphite and hexa(tridecyl)-1,1,3-tris(2-methyl-4-hydroxy-5-t-butylphenyl)butanetriphosphite.

4. The high damping material composition according to claim 1, wherein the damping property imparting agent includes at least one nitrogen-containing basic compound selected from the group consisting of N,N'-diphenylguanidine, N,N'-diortho-tolylguanidine, tris(2,3-dibromopropyl)isocyanurate, polyethyleneimine and 8-acetyl-3-dodecyl-7,7,9,9-tetramethyl-1,3,8-triazaspiro[4.5]decane-2,4-dione.

5. The high damping material composition according to claim 1, wherein the damping property imparting agent includes at least one hindered amine compound selected from the group consisting of tetrakis(2,2,6,6-tetramethyl-4-piperidyl)-1,2,3,4-butanetetracarboxylate, a condensate of 1,2,3,4-butanetetracarboxylic acid, 2,2,6,6-tetramethyl-4-piperidinol and β,β,β',β'-tetramethyl-3,9-(2,4,8,10-tetraoxyaspiro[5.5]undecane)diethanol, a mixture of β-alanine,N-(2,2,6,6-tetrametiyl-4-piperidinyl)-dodecylester and β-alanine,N-(2,2,6,6-tetramethyl-4-piperidinyl)-tetradecylester, 3-dodecyl-1-(2,2,6,6-tetramethyl-4-piperidinyl)pyrrolidine-2,5-dione and N-acetyl-3-dodecyl-1-(2,2,6,6-tetramethyl-4-piperidinyl) pyrrolidine-2,5-dione.

6. The high damping material composition according to claim 1, comprising the following component (C):

(C) a regulator for a peak temperature of a damping property further comprising at least one of a compound having a polyamine as a main skeleton structure and a compound having polyamide amine as a main skeleton structure.

7. The high damping material composition according to claim 1, comprising the following component (C) having an amine value of 100 to 1000;

(C) a regulator for a peak temperature of a damping property comprising at least one of a compound having a polyamine as a main skeleton structure and a compound having polyamide amine as a main skeleton structure.

8. The high damping material composition according to claim 1, comprising the following component (D);

(D) a damping property imparting agent for lowering a peak temperature of a damping property, which comprises at least one of an acrylic monomer and an acrylic oligomer.

9. The high damping material composition according to claim 1, comprising the following component (E);

(E) an acidic organic compound comprising at least one of naphthenic acid and a plant organic acid.

10. The high damping material composition according to claim 1, comprising the following component (F);

(F) an amorphous resin comprising at least one selected from the group consisting of coumarine resin, phenol resin, ketone resin, dicyclopentadiene (DCPD) resin, maleic resin, esterified rosin, epoxy resin, urea resin and melamine resin.

11. The high damping material composition according to claim 1 comprising the following component (G);

(G) a plasticizer comprising at least one of dibutyl phthalate and dicyclohexyl phthalate.

12. The high damping material composition according to claim 1, comprising the following component (H);

(H) a crosslinking agent comprising at least one selected from the group consisting of a triazine crosslinking agent, a metal soap crosslinking agent, an amine crosslinking agent, a carbamate crosslinking agent, an imidazol crosslinking agent and a sulfur crosslinking agent.

13. The high damping material composition according to claim 1, comprising the following component (H) and a crosslinking accelerator, wherein the component (H) and the crosslinking accelerator are present in a total amount of 0.5 to 20 parts by weight, based on 100 parts of the component (A);

(H) a crosslinking agent comprising at least one selected from the group consisting of a triazine crosslinking agent, a metal soap crosslinking agent, an amine crosslinking agent, a carbamate crosslinking agent, an imidazol crosslinking agent and a sulfur crosslinking agent.

14. The high damping material composition according to claim 1, comprising the following component (I), wherein the component I is present in a proportion of 5 to 40 parts by weight, based on 100 parts of the component (A);

(I) a foaming agent.

15. The high damping material composition according to claim 1, comprising the following component (I) and a foaming aid, wherein the component (I) and the foaming aid are present in a total amount of 5 to 40 parts by weight, based on 100 parts of the component (A);

(I) a foaming agent.

* * * * *